United States Patent
Ventrice et al.

(10) Patent No.: US 10,384,135 B2
(45) Date of Patent: Aug. 20, 2019

(54) ADAPTIVE WIZARD FOR GAMIFICATION SITE CREATION

(71) Applicant: Callidus Software, Inc., Dublin, CA (US)

(72) Inventors: Anthony J. Ventrice, Loma Mar, CA (US); Stephen A. Sims, Foster City, CA (US)

(73) Assignee: Callidus Software, Inc., Dublin, CA (US)

( * ) Notice: Subject to any disclaimer, the term of this patent is extended or adjusted under 35 U.S.C. 154(b) by 446 days.

(21) Appl. No.: 14/986,031

(22) Filed: Dec. 31, 2015

(65) Prior Publication Data

US 2017/0189814 A1 Jul. 6, 2017

(51) Int. Cl.
 *G06Q 30/00* (2012.01)
 *A63F 13/79* (2014.01)

(52) U.S. Cl.
 CPC .................................. *A63F 13/79* (2014.09)

(58) Field of Classification Search
 None
 See application file for complete search history.

(56) References Cited

U.S. PATENT DOCUMENTS

| | | | | |
|---|---|---|---|---|
| 9,336,481 B1* | 5/2016 | Ionson | ...................... | G06N 5/04 |
| 2009/0228426 A1* | 9/2009 | Bonasso | ................ | G06N 20/00 |
| | | | | 706/60 |
| 2013/0291065 A1* | 10/2013 | Jakowski | ................ | G06F 15/16 |
| | | | | 726/4 |
| 2014/0058801 A1* | 2/2014 | Deodhar | ............ | G06Q 10/0639 |
| | | | | 705/7.38 |
| 2014/0126708 A1* | 5/2014 | Sayko | .................... | H04M 11/00 |
| | | | | 379/93.01 |
| 2014/0126715 A1* | 5/2014 | Lum | ................... | H04M 3/5133 |
| | | | | 379/265.09 |
| 2014/0187342 A1* | 7/2014 | Brady | ...................... | A45F 3/04 |
| | | | | 473/288 |
| 2014/0195272 A1* | 7/2014 | Sadiq | .................... | G06Q 40/08 |
| | | | | 705/4 |
| 2014/0228118 A1* | 8/2014 | Hardy | .................. | G06T 19/006 |
| | | | | 463/31 |
| 2014/0274413 A1* | 9/2014 | Chelst | .................. | A63F 13/795 |
| | | | | 463/42 |
| 2014/0315164 A1* | 10/2014 | Jones | ..................... | G09B 19/16 |
| | | | | 434/219 |
| 2015/0019352 A1* | 1/2015 | Flynn | .................... | G06F 16/972 |
| | | | | 705/14.73 |
| 2015/0127365 A1* | 5/2015 | Rizvi | .................. | G02B 27/017 |
| | | | | 705/2 |

(Continued)

*Primary Examiner* — Matthew T Sittner

(57) ABSTRACT

Systems, methods, and computer-readable media for generating, by an adaptive wizard, a customized gamification system to a customer. The gamification system is a system of events and milestones that provides a means by which the customer can recognize and award desired behavior patterns in order to increase engagement with users. The adaptive wizard generates the gamification system based on customer input and/or observed user behavior on a customer website. The adaptive wizard receives the input and determines content of the gamification system. The adaptive wizard processes the inputs and develops the gamification system for implementation by the customer to assist in achieving customer enterprise goals.

16 Claims, 14 Drawing Sheets

(56) References Cited

U.S. PATENT DOCUMENTS

| | | | |
|---|---|---|---|
| 2015/0242793 A1* | 8/2015 | Williams | G06Q 10/06398 705/7.42 |
| 2015/0262109 A1* | 9/2015 | Ainsworth, III | G06Q 10/06398 705/7.42 |
| 2015/0278158 A1* | 10/2015 | Singh | G06F 16/954 703/2 |
| 2015/0375040 A1* | 12/2015 | Sigal | A63B 24/0059 482/4 |
| 2016/0012559 A1* | 1/2016 | Patterson | G06F 16/9535 705/328 |
| 2016/0034923 A1* | 2/2016 | Majumdar | G06Q 40/00 705/7.29 |
| 2016/0048643 A1* | 2/2016 | Woods | G16H 10/60 705/3 |
| 2016/0086121 A1* | 3/2016 | Heilbrunn | G06Q 10/06393 705/7.39 |
| 2016/0232624 A1* | 8/2016 | Goldberg | G06Q 30/02 |
| 2016/0349960 A1* | 12/2016 | Kumar | G06F 3/04817 |
| 2016/0357498 A1* | 12/2016 | Krasadakis | G07F 17/3227 |
| 2016/0379184 A1* | 12/2016 | Smith | G06Q 20/042 705/14.23 |
| 2017/0189814 A1* | 7/2017 | Ventrice | A63F 13/79 |

* cited by examiner

ADAPTIVE WIZARD FOR GAMIFICATION SITE CREATION

BACKGROUND

Throughout society, there are many facets in which people would like to encourage particular behaviors of others, such as to accomplish certain goals. In education, educators would like students to complete lessons. In business, companies would like to train people efficiently and effectively. However, the motivation to learn, train, or complete other activities in a timely mariner is not always present. Traditionally, people have been motivated by extrinsic factors, such as monetary compensation in the form of a bonus check for high performance. The monetary awards, however, can be costly for businesses, and are not feasible in many other facets of society.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
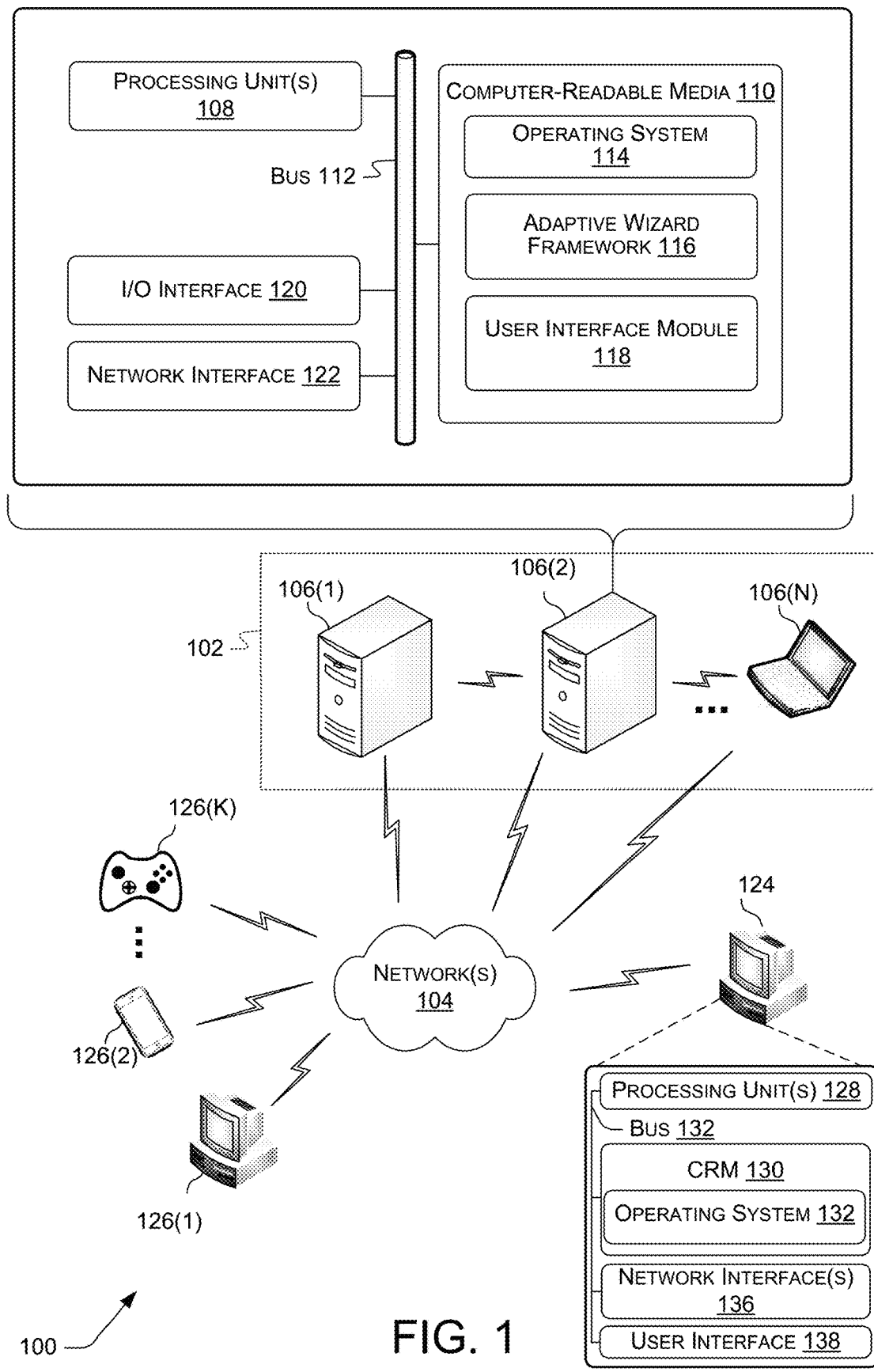
FIG. 1 is a block diagram depicting an example environment in which examples of using an adaptive wizard to generate and/or monitor a gamification system can operate.

The technologies described herein provide techniques and constructs to use an adaptive wizard to generate a gamification system. The gamification system is a system of recorded events and milestones that allow a customer to easily discern, recognize, and award desired behavior patterns in order to increase engagement with users. A computing system utilizes the adaptive wizard to generate the gamification system based on customer input and/or observed user behavior on a website of the customer such as, via a network connection. In some examples, the adaptive wizard receives input from a customer to determine a use-case (e.g., a scenario). In some examples, the adaptive wizard monitors network activity (e.g., user actions on a customer website) to determine the use-case based on the network activity.

In various examples, the adaptive wizard can generate a questionnaire (e.g., a list and/or series of one or more questions) for the customer to answer regarding the customer's operations. In such examples, the questionnaire can be based at least in part on the customer use case, and can be used by the adaptive wizard to determine one or more goals of the customer and/or the customer enterprise, a category of the gamification system, and/or a model of the gamification system. In some examples, the adaptive wizard can monitor network activity with respect to the customer to determine the one or more goals, the category and/or the model.

Additionally, the adaptive wizard generates one or more features for the customized gamification system, a feature being a set of recognition constructs and visualizations combined with an explicit purpose in mind. The one or more of features can be based on the answers to the questionnaire, the one or more goals of the customer and/or the customer enterprise, the category, and/or the model determined by the adaptive wizard. Often, multiple acceptable approaches exist to a use-case. Therefore, an adaptive wizard can be configured to accommodate some amount of subjective input in the form of required features, recommended features, and/or optional features for the gamification system. The features can include, but are not limited to, tracks, rewards, levels, competitions, and the like. In various examples, the features may include sub-features for selection. For example, a track feature may include subject-based expertise areas such as chess expert, bridge expert, go expert, etc. to add to the customized gamification system.

The adaptive wizard identifies visualizations for the customized gamification system. In some examples, the adaptive wizard may apply default visualizations to the customized gamification system based on the inputs from the customer. In some examples, the adaptive wizard can generate customized visualizations for the gamification system based on customer input. Additionally or alternatively, the adaptive wizard can receive visualizations from the customer and/or another source, and may apply the visualizations to the customized gamification system.

Based on the determined scenario, goal(s), model, feature(s), and/or visualization(s), the adaptive wizard can build the gamification system. Additionally, the adaptive wizard can automatically connect to known platforms and pull appropriate data to assist in building and/or inclusion in the gamification system. For example, the adaptive wizard can pull data from external sources, such as learning management systems, customer relationship management systems, social collaboration software, etc., and include the data in the gamification system. In various examples, the adaptive wizard can push the gamification system a customer website, send the gamification system to the customer, or otherwise make the gamification system available to the customer for implementation. The gamification system can be implemented, such as on a customer website, to log events, and, when predefined milestones are met, recognize and/or award the user.

In various examples, the adaptive wizard can monitor the performance of the customized gamification system. In such examples, the adaptive wizard determines a success of the customized gamification system in achieving the one or more goals of the customer and/or the customer enterprise. Based on a determination that one or more goals of the customer and/or the customer enterprise are not being achieved, the adaptive wizard may determine to modify one or more aspects of the customized gamification system. As such, the adaptive wizard can modify, add, and/or remove one or more features and/or visualizations of the customized gamification system, and push the update and/or a notification thereof (e.g., make the update accessible) to the customer computing device and/or a customer website for implementation.

Additionally or alternatively, the adaptive wizard can include functionality to monitor trends in the use case (e.g., scenario) and/or subset of the use case and determine that an adjustment to the customized gamification system may be necessary. The adaptive wizard can then modify one or more features and/or one or more visualizations of the customized gamification system to further increase engagement with users and assist in goal achievement.

Illustrative Environment

The environment described below constitutes but one example and is not intended to limit the claims to any one particular operating environment. Other environments can be used without departing from the spirit and scope of the claimed subject matter.

FIG. 1 is a block diagram depicting an example environment 100 in which examples of using an adaptive wizard to generate and/or monitor a gamification system can operate. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, and/or special purpose-type devices. Thus, although illustrated as desktop and laptop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, telecommunication devices, thin clients, terminals, personal data assistants (PDAs), game consoles, gaming devices, work stations, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

CRM described herein, e.g., CRM 110, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106.

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 110 can include, for example, an operating system 114, an adaptive wizard framework 116, a user interface module 118, and other modules, programs, or applications that are loadable and executable by processing units(s) 108. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU course embedded in an FPGA fabric.

Device 106 can also include one or more input/output (I/O) interfaces 120 to allow device 106 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). For simplicity, other components are omitted from the illustrated device 106.

Device 106 can also include one or more network interfaces 122 to enable communications between computing device 106 and other networked devices such as customer computing device(s) 124 through which a customer can submit an input (e.g., selection of use case, answers to questions, feedback, etc.). Such network interface(s) 122 can include one or more network interface controllers (NICs) or other types of transceiver devices to send and receive communications over a network.

Customer computing device 124 can belong to a variety of categories or classes of devices such as traditional server-type devices, desktop computer-type devices, mobile devices, special purpose-type devices, embedded-type devices, and/or wearable-type devices. Thus, although illustrated as a desktop computer, device 124 can include a diverse variety of device types and are not limited to a particular type of device. Customer computing device 124 can include, but is not limited to, a server computer or blade server such as a Web server, a map/reduce server, or other computation engine, or network-attached-storage unit, laptop computer, thin client, terminal, or other mobile computer, personal data assistant (PDA), tablet computer or tablet hybrid computer, smartphone, mobile phone, mobile phone-tablet hybrid device, or other telecommunication device, a portable or console-based gaming device or other entertainment device such as a network-enabled television, a set-top box, a media player, or other computing device configured to participate in or carry out the generation and monitoring of a customized gamification system.

Customer computing device 124 can represent any type of computing device having one or more processing unit(s) 126 operably connected to computer-readable media (CRM) 128 such as via a bus 130, which in some instances can include one or more of a system bus, a data bus, an address bus, a PCI bus, a Mini-PCI bus, and any variety of local, peripheral, and/or independent buses.

Executable instructions stored on CRM 128 can include an operating system 132 and other modules, programs, or applications that are loadable and executable by processing units(s) 126. Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Customer computing device 124 also includes one or more I/O interfaces including one or more network interface 134 to enable communications between customer computing device 124 and other networked devices such as devices 106 and user computing devices 138 over network(s) 104. The network interface 134 can include one or more network interface controllers (NICs) or other types of transceiver devices to send and receive communications over a network.

Customer computing device 124 also includes a user interface 136 to enable the device 124 to receive user input and communicate the input to the device 106. Examples support the user interface 136 providing a display of a graphical user interface communicated from the device 106 to the customer computing device 124, via network 104. In various examples, the user interface 136 can receive input from the customer, such as, for example, a response to a question generated by the adaptive wizard framework 116. Based at least in part on the input from the customer computing device 124, the adaptive wizard framework 116 can develop a customized gamification system for implementation by the customer computing device 124.

Other devices involved in the gamification system development can include user computing devices 138(1)-138(K). User computing device(s) 138 can belong to a variety of categories or classes of devices such as traditional consumer-type devices, desktop computer-type devices, mobile devices, special purpose-type devices, embedded-type devices, and/or wearable-type devices. Thus, although illustrated as mobile computing devices, which can have less computing resources than device(s) 106, consumer computing device(s) 138 can include a diverse variety of device types and are not limited to any particular type of device. Consumer computing device(s) 138 can include, but are not limited to, server computers or blade servers such as Web servers, map/reduce servers or other computation engines, network-attached-storage units, or desktop computer (e.g., 138(1)), laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices, tablet computers or tablet hybrid computers, smartphones, mobile phones, mobile phone-tablet hybrid devices, or other telecommunication devices (e.g., 138(2)), portable or console-based gaming devices or other entertainment devices such as network-enabled televisions, set-top boxes, media players, cameras, or personal video recorders (PVRs) (e.g., 126(K), represented graphically as a gaming console), automotive computers such as vehicle control systems, or vehicle security systems, or integrated components for inclusion in computing devices, appliances, or other computing devices configured to participate in or carry out object detection and classification optimization as described herein.

In various examples, the user computing device(s) 138 can be configured to access and participate in the development of a customized gamification system via network(s) 104. For example, the user computing device(s) 138 can access the customized gamification system via a website. Additionally or alternatively, the user computing device(s) 138 can access the customized gamification system through an application and/or other program saved to a distributed computing resource, such as distributed computing resources 102, the customer computing device(s) 124 and/or the user computing device(s) 138. In various examples, the customer computing device 124, the user computing device(s) 138 and/or the adaptive wizard framework 116 can monitor interactions and progress of the user computing device(s) 138 through the customized gamification system. In some examples, the customer computing device 124 can send progress updates to the adaptive wizard framework 116 for the adaptive wizard to determine if an update to the customized gamification system is necessary. Additionally or alternatively, the adaptive wizard framework 116 can monitor the user progress and interactions with the customized gamification system. The adaptive wizard framework 116 can compare the observed user progress and interactions with the customer goals, and generate updates and/or modifications as necessary based on the comparison.

Figure 2:
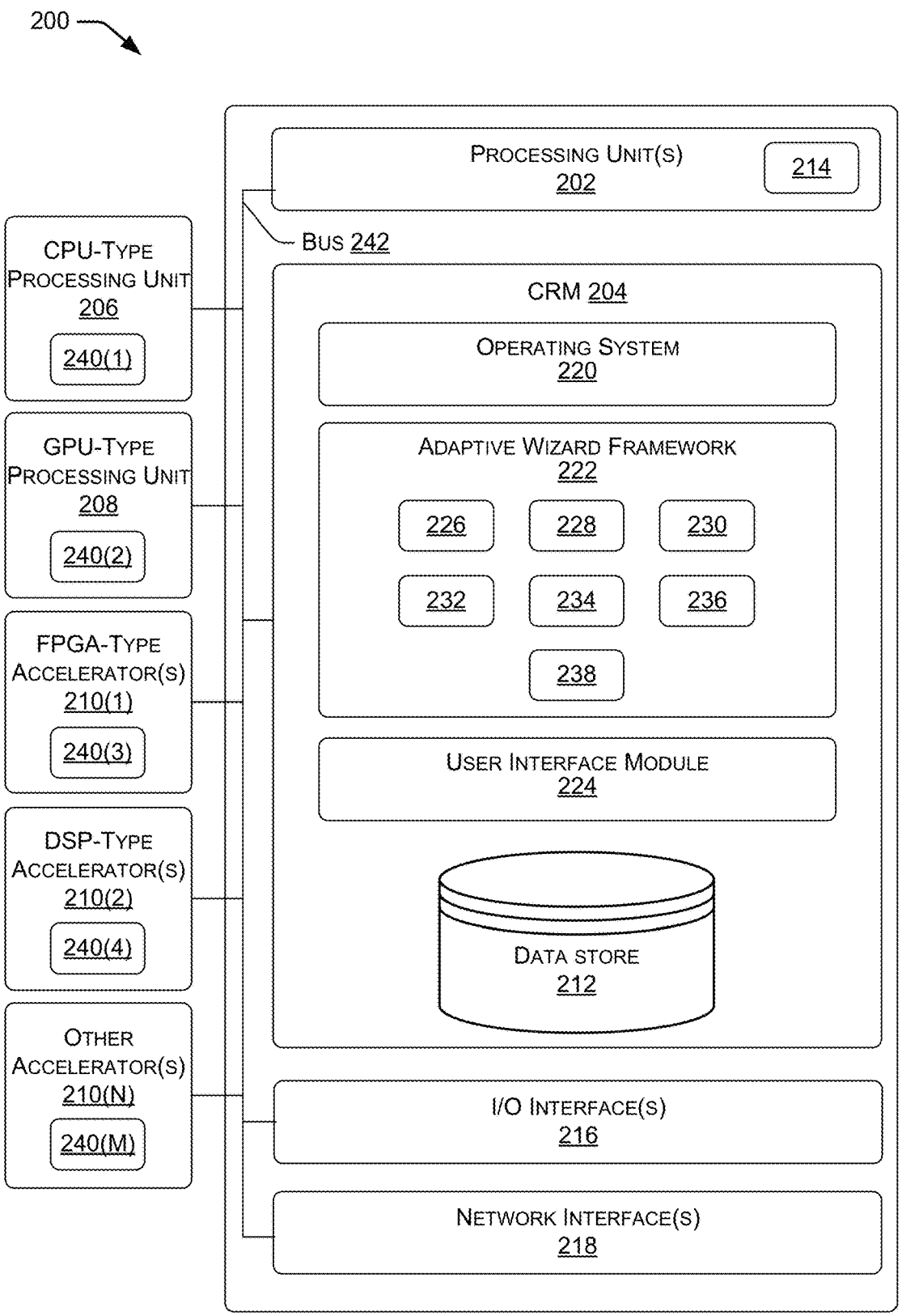
FIG. 2 is a block diagram depicting an example computing device configured to use an adaptive wizard generate and/or monitor a gamification system.

FIG. 2 is a block diagram depicting an example computing device 200 configured to use an adaptive wizard to generate and/or monitor a customized gamification system. In some examples, computing device 200 may be one computing device of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, CRM 204 can represent CRM 110 and can store instructions executable by the processing unit(s) 202, which as discussed above, can represent a processing unit incorporated in device 200. CRM 204 also stores instructions executable by external processing units such as by an external CPU-type processing unit 206, an external GPU-type processing unit 208, and/or executable by an external accelerator 210, such as an FPGA-type accelerator 210(1), a DSP-type accelerator 210(2), or any other accelerator 210(N). In various examples at least one CPU-type processing unit, GPU-type processing unit, and/or accelerator is incorporated in device 200, while in some examples one or more of a CPU-type processing unit, GPU-type processing unit, and/or accelerator is external to device 200.

In the illustrated example, CRM 204 also includes a data store 212. In some examples, data store 212 includes data storage such as a database, data warehouse, or other type of structured or unstructured data storage. In some examples, data store 212 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 212 stores data and/or instructions for the operations of processes, applications, components, and/or modules stored in CRM 204 and/or executed by processing unit(s) 202. Alternately, some or all of the above-referenced data and/or instructions can be stored on separate memories 214 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 216, which can be I/O interface 120 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 218, which can be network interface(s) 122, can represent, for example, network interface controllers (NICs) or other types of transceiver devices to send and receive communications over a network.

In the illustrated example, CRM 204 also includes an operating system 220, which can be operating system 114. CRM 204 also includes an adaptive wizard framework 222, which can be adaptive wizard framework 116, and user interface module 224, which can be user interface module 118. The user interface module includes logic to program the processing unit 202 of the device 200 to receive and/or extract data from the adaptive wizard framework 116, and to display the extracted data on a display of a customer computing device, such as customer computing device 124. In various examples, the user interface module 224 can further include logic to program the processing unit 202 to receive input from the customer computing device, and send the input to a respective module and/or API of the adaptive wizard framework for processing.

The adaptive wizard framework 222 includes one or more modules and/or APIs, which are illustrated as blocks 226, 228, 230, 232, 234, and 236 although this is just an example, and the number can vary higher or lower. Functionality described associated with blocks 226, 228, 230, 232, 234, and 236 can be combined to be performed by a fewer number of modules and/or APIs or it can be split and performed by a larger number of modules and/or APIs. For example, block 226 can represent a scenario module with logic to program the processing unit 202 to send a list of scenarios (e.g., use cases, etc.) and/or sub-scenarios to a customer computing device, via the user interface. In various examples, the scenarios can include a set of broad use cases of a customer enterprise. In some examples, the scenarios can include a facet of the customer enterprise that involves user interaction. The scenarios can include community participation, general participation, competition, redemptive loyalty, tiered loyalty, software onboarding, trial conversion, lifestyle modification, medical and/or fitness adherence, education and/or training, performance management, content consumption, event participation, and the like.

In some examples, the sub-scenarios can include narrower descriptions of the particular scenario of the customer enterprise. For example, a community participation enterprise can be further refined to an internal community, an external community or an external product advocacy community.

Additionally, the scenario module includes logic to the program processing unit 202 to extract the customer-selected scenario (e.g., a selection of a use case, etc.) and/or the sub-scenario from the user interface module and provide it to the adaptive wizard framework 222 for processing. For example, a customer may select an employee training enterprise into a user interface in order to build a gamification system directed to improving the efficiency and effectiveness of employee training. In such an example, the scenario module may receive the input of an education and/or training scenario, and provide that to the adaptive wizard framework.

Block 228 can represent a goal-defining module configured to determine a series of one or more questions to present to the customer, via the user interface module, in order to tune the design of the gamification system. The series of questions can be selected by the goal-defining module based at least in part on the scenario and/or sub-scenario received by the scenario module. The list of questions can include yes or no questions and/or fill-in-the-blank questions regarding the customer's scenario. In various examples, the series of questions can include broad and/or specific questions about the customer's scenario. For example, in a community participation scenario, the list of questions may include questions such as "how many people are in the community?" and "how many people are regular content creators?"

In various examples, the goal-defining module can include logic to program the processing unit 202 to transmit the series of questions to the customer via the user interface module. In such examples, the goal-defining module includes logic to program processing unit 202 to extract response input to the series of questions from the user interface module, and provide the response input to the adaptive wizard framework for processing. In some examples, one or more questions of the series of questions can be generated heuristically, based on response input from one or more preceding questions. In such examples, the series of questions can be an iterative series of questions, developed real-time, based on customer response input.

In various examples, the goal-defining module can receive the response input from the series of questions, and can determine one or more customer and/or customer enterprise goals (e.g., objectives) based on the response input (e.g., answers to the questions). In some examples, the goal-defining module can determine a category (e.g., type) of the gamification system based on the response input. The one or more customer and/or customer enterprise goals, and/or the category can also be based on historical data of other gamification systems. The historical data can be stored in the device 200, such as in data store 212, and/or in an external storage device. Additionally, the goal-defining module can determine a model for the customized gamification system. In various examples, the model can be based on the customer responses to questions, the defined goals, the category, the monitored actions, and/or the historical data.

Block 230 can represent a feature module configured to determine one or more features to provide in the model of the customized gamification system. The one or more features can be based on the use case, a subset of the use case, and/or the response input. The one or more features can include tracks (e.g., expertise tracks, affinity tracks, etc.), awards, levels, competitions, currencies (e.g., karma currency or good deed points, expertise currency, etc.), task lists, repeating task lists, career badges, data visualizations, collections, streaks, streams (e.g., activity streams, personal streams, etc.), people following, content following, redemptions (e.g., points redemption, badge redemption, scheduled redemption, etc.), scheduled raffles, prompts, and the like. The one or more features can include a list of required, recommended, and/or optional features and/or sub-features for the customized gamification system.

The feature module includes logic to the program processing unit 202 to send the one or more features and/or sub-features to the customer computing device via the user interface module. Additionally, the feature module includes logic to program the processing unit 202 to extract selected features and/or sub-features from the user interface module and provide the selected features and/or sub-features to the adaptive wizard framework for processing. For example, the feature module can recommend that the customized gamification system include a progressive levels system (e.g., various levels of achievement) for a user to accomplish in order to encourage participation. In such an example, feature module can cause for display a user interface for the customer to select, rename and/or modify various levels. For example, the feature module can display Novice, Student, Citizen, Veteran and Champion levels with corresponding point thresholds of 5, 20, 50, 200 and 300 points. The customer can modify the levels, such as by renaming the level or changing the point threshold needed to achieve each level. The adaptive wizard framework can save the customer selection of levels, and implement the levels in the customized gamification system.

Block 232 can represent a visualization module with logic to program processing unit 202 to discover visualizations for the customized gamification system. In various examples, the visualizations can be stored in the data store 212, and/or in another data store located in or coupled to the device 200. For example, the visualizations may be stored in an external data store coupled to the device. For another example, the visualizations may be stored in a remote location, and accessible by the visualization module via the network interface(s) 218.

In various examples, the visualization module can select one or more default visualizations for the customized gamification system. In some examples, the visualization module can receive custom visualizations for the customized gamification system. The custom visualizations can be provided by the customer and/or another external source. In some examples, the customer can request custom visualizations from the adaptive wizard framework. In such examples, the customer can provide one or more features of the custom visualizations, and the visualization module can create the custom visualizations.

Block 234 can represent an analytics report module. In various examples, the analytics report module can generate scenario-appropriate analytics reports based in part on the goal and/or the scenario. The analytics reports can include data with regard to the scenario, sub-scenario, goal, and other information determined throughout the gamification system generation process. In some examples, the analytics reports can be stored in a memory of the device 200, such as in data store 212. In such examples, the analytics reports can be accessed by the adaptive wizard for generating subsequent gamification systems. Additionally or alternatively, the analytics reports can be provided to the customer via the user interface and/or another method of communicating information to the customer.

Block 236 can represent a building module configured to receive input from one or more of blocks 226, 228, 230, 232 and 234, and build customized gamification system for the customer. In various examples, the building module can include logic to program the processing unit 202 of device 200 to send the customized gamification system to the customer. In various examples, the customized gamification system can be sent to a designated website and/or URL of the customer. In such examples, the adaptive wizard framework may receive the designated website and/or URL from the customer. The customized gamification system can thus be implemented by the customer to recognize and award desired behavior patterns and boost engagement in order to achieve the one or more goals of the customer.

Block 238 can represent a monitoring module with logic to program the processing unit 202 for extraction of progress data from the customized gamification system (e.g., training completed, levels achieved, and any other statistics relevant to the achievement of one or more customer goals). In some examples, the progress data may be stored on computing device 200, such as, for example, in data store 212. In some examples, the progress data can be extracted or received from a remote computing device, such as via the network interface 218, and stored in data store 212.

In various examples, the monitoring module can monitor the progress data, and determine that an update to the customized gamification system may be necessary. The determination can be based on a failure of the customized gamification system to achieve one or more of the customer's goals. In various examples, the monitoring module can monitor progress data of gamification systems in a use case. In such examples, the monitoring system can process the progress data of gamification systems across the use case, and identify areas of potential improvement. Based on an identification of an area of potential improvement, the monitoring module can update the gamification systems across the use case, to improve goal achievement for the customer.

In some examples, the monitoring module can update the customized gamification system periodically, such as, for example, at a specified time each week. In such examples, the customized gamification system may be periodically updated in order to optimize the gamification system for the customer. In some examples, the periodic interval can be determined by a program manager (e.g., monthly, weekly, daily). In some examples, the monitoring module can obtain or access data when manually directed by the program manager.

The functionality of modules can be combined to generate a gamification system. By way of example, and not limitation, the modules can be combined as shown in Table 1:

TABLE 1

Define the customer goal
    Increase a number and quality of knowledge base articles on community software platform
Add customer goal to analytics report
Determine who creates the knowledge base articles
    White collar salaried employees
Determine a scenario
    Scenario: community
Determine a sub-scenario
    Sub-scenario: content creator
Generate one or more features for the scenario
    Suggested features: career badges, expertise tracks, site activity stream, player stream, content following
    Optional features: people following, levels, competitions
Determine a community platform to use for the gamification system
    Automate input of behavior events
    Receive answers to questions
    Tune underlying algorithms of the features
      Content rating system(s) combined as an input to expertise tracks.
      Lack of any content rating system will substitute alternate content metrics (views, shares, bookmarks).
      Questions about number of users and percentage of users are content creators used to divide community by persona types.
      Questions about content creation used to set content-creation goals for the content creator persona type.
      Set default visualizations for features.
Generate a career showcase visualization
    Career badges, expertise tracks list, expertise status badges and in-line expertise badges for expertise tracks, scrolling event lists for activity streams, notifications inbox, pop-up notifications for content following and people following, etc.

Alternatively, some or all of the above-referenced data can be stored on separate memories 240, such as memory 240(1) on board a CPU-type processing unit 206, memory 240(2) on board a GPU-type processing unit 208, memory 240(3) on board an FPGA-type accelerator 210(1), memory 240(4) on board a DSP-type accelerator 210(2), and/or memory 240(M) on board another accelerator 210(N).

Bus 242, which can be bus 112, and which in some instances can include one or more of a system bus, a data bus, an address bus, a PCI bus, a Mini-PCI bus, and any variety of local, peripheral, and/or independent buses, can operably connect CRM 204 to processing unit(s) 202.

Figure 3:
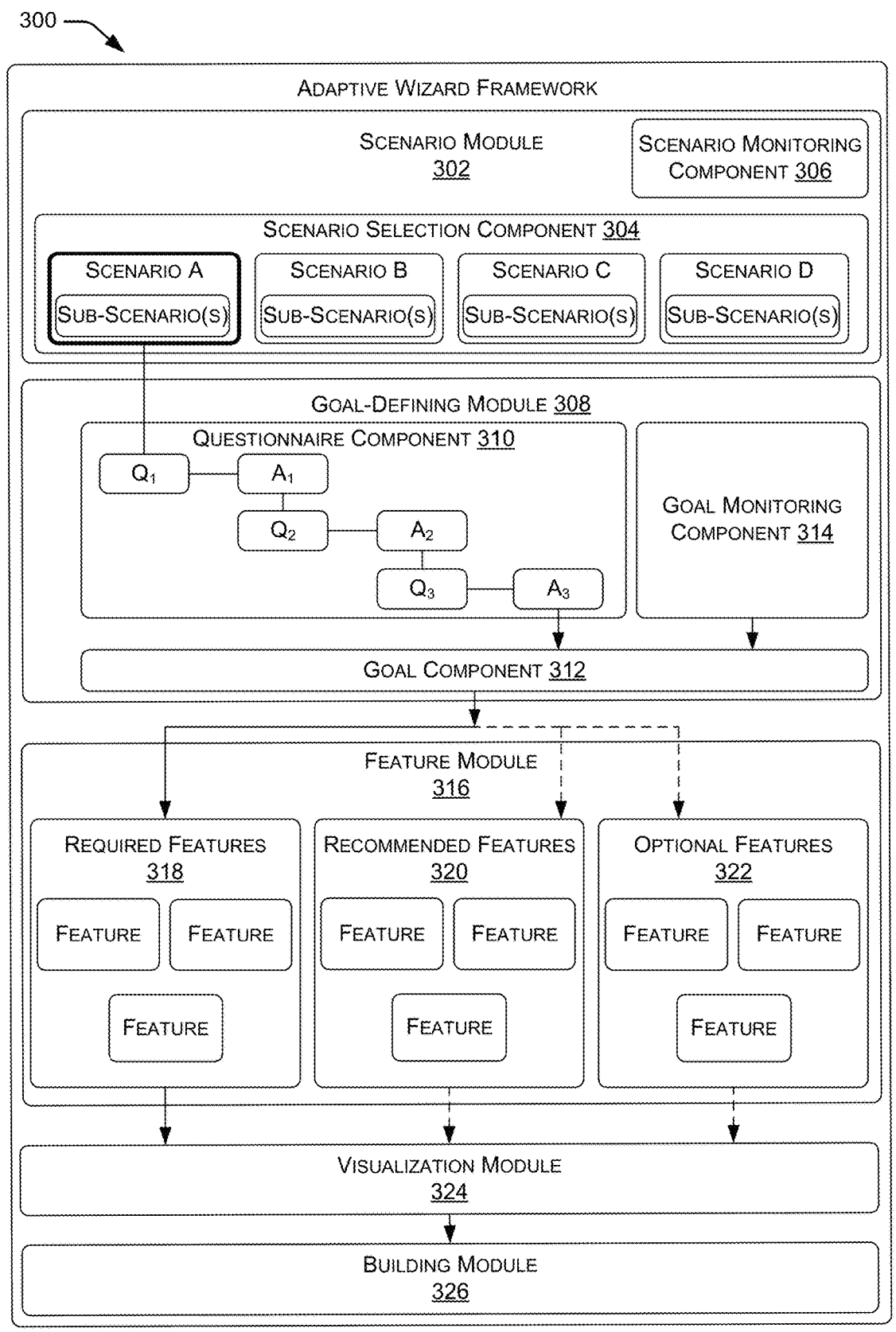
FIG. 3 is a block diagram depicting an example adaptive wizard framework module of a computing device configured to generate a gamification system.

FIG. 3 is a block diagram depicting an example adaptive wizard framework 300 of a computing device configured to generate a gamification system. In various examples, the scenario module 302, such as described at block 226, can include a scenario selection component 304 and/or a scenario monitoring component 306. The scenario module 302 can be configured to determine a general enterprise to which the gamification system is directed.

In various examples, the scenario selection component 304 may cause a display of, e.g., via a user interface module, a list of one or more scenarios (e.g., use cases) in which a customer may want to encourage particular user behaviors. The scenarios includes a broad description of a field and/or enterprise in which the customer operates, such as, for example, community participation, participation in general, education/training, performance management, content consumption, an event, or other over-arching scenario in which the customer operates. In the illustrative example, the scenario selection component 304 includes four scenarios, e.g., scenarios A-D. In other examples, the scenario selection 304 can include a greater or lesser number of scenarios.

In various examples, the scenario selection component 304 can receive a scenario selection input, such as scenario A of scenarios A-D. In some examples, based on the selection of the scenario, the scenario selection component 304 can display one or more sub-scenarios on the user interface, in order to narrow the particular use case of the customer enterprise. In such examples, the scenario selection component 304 can be configured to receive and process a sub-selection input. For example, a scenario selection component 304 may receive input indicating that a customer enterprise includes a community participation initiative. Responsive to the input, the scenario selection component 304 may display sub-scenarios for selection via the user interface, such as, for example, internal community, external community, and external product advocacy, to further narrow a focus of the gamification system.

In various examples, the scenario selection component 304 can provide explanatory information regarding the scenarios and/or the sub-scenarios. As will be discussed in further detail with regard to FIG. 4, the explanatory information can be provided upon selection of a scenario and/or a sub-scenario and/or a link, such as, for example, a mouse-over or clickable information link on the user interface. The explanatory information can include details and/or a focus of a particular scenario and/or the corresponding sub-scenarios. For example, based on an input selection of a community participation scenario, the scenario selection component 304 can provide a description of the community participation scenario, e.g., the community participation scenario is an effective solution to encourage users to contribute to online communities and improve the quality of conversations and interactions.

In some examples, the scenario module 302 can include a scenario monitoring component 306 to monitor actions on a customer website. The actions include user actions and/or customer actions, such as on a website of the customer. The scenario monitoring component 306 processes the monitored actions, and determines a scenario of the customer enterprise to encourage user behaviors. For example, a customer website may include community participation and training. The community participation, such as the number of views, articles shared, blog entries, etc. may be significant, however the participators may lag behind in meeting training objectives. Thus, the scenario monitoring component 306 may recognize that the scenario that needs improvement is the education/training scenario.

In various examples, the adaptive wizard framework 300 can include a goal-defining module 308. The goal-defining module can be configured to determine one or more goals (e.g., objectives) of the customer in the scenario and/or customer enterprise. The one or more goals can be based on particular user behaviors and/or behavior patterns associated with the customer enterprise (e.g., increase in participation, reviewed blog posts, training completed, amount of content consumed, etc.). In some examples, the goal-defining module can determine a category (e.g., type) of the gamification system based on the response input.

The goal-defining module 308 can include a questionnaire component 310. The questionnaire component 310 can be configured to receive scenario and/or sub-scenario input from the scenario module 302. In the illustrative example, the questionnaire component 310 receives scenario A and corresponding sub-scenario input from the scenario selection component 304 of the scenario module 302. Additionally or alternatively, the questionnaire component 310 can receive scenario and/or sub-scenario input from the scenario monitoring component 306 of the scenario module 302.

In various examples, the questionnaire component 310 can process the scenario and/or sub-scenario input, and determine a list of questions to present to the customer via the user interface. In such examples, the list of questions is determined based on historical data associated with the scenario and/or the sub-scenario. In various examples, the questionnaire component 310 can use historical data to answer some questions and develop other questions. For example, in a particular community scenario, the historical data may include information on how many people participate in the particular community. Thus, the questionnaire component 310 would may skip the question of how many people, and may proceed to ask how many people are active in the particular community. In some examples, the list of questions can include broad and/or narrow questions directed to the customer enterprise. For example, in a community participation scenario, the questions may be directed to the number of participants in the community, the number of active participants in the community, a number of posts, etc.

In some examples, the questionnaire component 310 can process the scenario and/or the sub-scenario input, and generate a series of questions, each of the series of questions based in part on the answer to the preceding questions. The questions in the series of questions can include broad and/or narrow questions. In some examples, the first question can be broad, and the subsequent questions can be progressively narrower.

For example, as illustrated in FIG. 3, the questionnaire component 310 processes the scenario A and corresponding sub-scenario input, and generates a first question ($Q_1$) to present to the customer via the user interface. The first question ($Q_1$) can include a broad question regarding the scenario and/or the sub-scenario with respect to the customer's operations. The questionnaire component 310 receives an answer ($A_1$), and generates a second, narrower question ($Q_2$) to present to the customer. Responsive to receiving a second answer ($A_2$), the questionnaire component 310 generates a third question ($Q_3$). In the illustrative example, the questionnaire component 310 receives the third answer ($A_3$), and determines that a sufficient amount of information has been received to determine a customer goal. In other examples, a greater or lesser number of answers may be necessary to determine a customer goal.

In various examples, the questionnaire component 310 can process and send the response inputs to the goal component 312. The goal component 312 processes the response inputs and determines the one or more goals (e.g., objectives) of the customer with respect to the customer enterprise. The one or more goals can be based on particular user behaviors and/or behavior patterns associated with the customer enterprise (e.g., increase in participation, reviewed blog posts, training completed, amount of content consumed, etc.). Additionally or alternatively, the goal component 312 can determine a category and/or an appropriate model for the customized gamification system to achieve customer's objectives. In some examples, category and/or the appropriate model for the customized gamification system can be determined based on the one or more defined goals. In various examples, the goal 312 can apply one or more algorithms to the response inputs and/or the one or more defined goals to determine the appropriate model for the customized gamification system. In some examples, the category and/or appropriate model for the customized gamification system can be determined based on historical data stored in data store internal and/or external to the adaptive wizard framework 300. For example, the historical data may include a plurality of successful gamification systems and the corresponding details (e.g., scenario, sub-scenario, answers to scenario-based questions, category, model, etc.). The adaptive wizard may input a particular scenario with corresponding answers to scenario-based questions, and determine, based on the historical data, which category and/or model fits the particular scenario.

Additionally or alternatively, the goal component 312 can receive input from a goal monitoring component 314 to identify the one or more goals of the customer and/or customer enterprise and/or the appropriate model for the customized gamification system. The goal monitoring component 314 monitors actions on a customer website. The actions include user actions and/or customer actions. The goal monitoring component 314 processes the monitored actions and recognizes an area which could be improved in the customer enterprise. In various examples, the goal monitoring component 314 can define one or more customer goals based on the recognized area for improvement. In some examples, the goal monitoring component 314 can send the processed data and identified area for improvement to the goal component 312. In such examples, the goal component 312 can determine a customer and/or customer enterprise goal based on the monitored data. For example, a goal monitoring component 314 may monitor an employee training web site and/or training program. The goal monitoring component 314 may recognize a decrease in employee participation at a certain point in an employee training program. The goal monitoring component 314 may process that information and send it to the goal component 312 to identify a goal of encouraging participation in training program at the point in which it decreases. Additionally, the goal component 312 can identify a category and/or an appropriate model for the customized gamification system to increase participation in the customer enterprise.

In various examples, the goal component 312 can send goal, the category and/or the model information to the feature module 316. The feature module 316 may receive the information and determine one or more features for the model to assist in achieving the defined goals, the category and/or the model. The feature module 316 can identify required features 318, recommended features 320, and/or optional features 322. The feature module 316 can cause the display of the required features 318, the recommended features 320 and/or the optional features 322 on a customer computing device via the user interface. In the illustrative example, the feature module identifies three required features 318, three recommended features 320 and three optional features 322. In other examples, the respective required features 318, recommended features 320 and/or optional features 322 can include more or less features to include in the customized gamification system.

In various examples, the required features 318, the recommended features 320, and/or the optional features 322 can include options to configure the respective features via the user interface. For example, a recommended feature of levels may include five levels, each with an image associated with it. The recommended features 320 may provide means by which a customer can choose the images associated with each level. In some examples, the required features 318, the recommended features 320, and/or the optional features 322 can include options to select and/or configure sub-features of the respective features. For example, an expertise track required feature may include a design sub-feature, a technical sub-feature, and a content sub-feature, to indicate three tracks in which the model may track performance.

In some examples, the recommended features 320, and/or the optional features 322 can include an option to de-select the respective features. The option to de-select respective features can include an on/off toggle, a delete button, or other way to indicate, via the user interface, that the respective feature will not be incorporated into the model of the customized gamification system.

In some examples, the required features 318, the recommended features 320, and/or the optional features 322 can include an option to view explanatory information regarding the respective feature. In such examples, the explanatory information may be viewable via a link on the user interface, such as, for example, a mouse-over or clickable information link on the user interface. The explanatory information can include details and/or benefits of the respective feature.

The required features 318 are features of the model that are deemed necessary to achieving the customer's goals. For example, in a community scenario with a defined goal of user participation, expertise tracks may be identified as a required feature to encourage participation. In various examples, the feature module 316 may determine that certain features are required features 318 based on historical data stored in data store internal and/or external to the adaptive wizard framework 300. For example, historical data may indicate a high goal achievement rate in an internal community to increase participation by including expertise tracks. Based on the goal achievement rate of previous models, the feature module 316 may determine that the expertise tracks feature is a required feature 318. For another example, historical data may indicate a 15% increase in participation in a similar models including the expertise tracks feature. Based on the increased participation in other similar models, the feature module 316 may determine that the expertise tracks feature is required. For another example, the adaptive wizard monitors a current gamification system and recommends a modification to a feature based on monitored data. The monitored data can show that the gamification system has an increase to 90% question resolution, but only an increase of 20% more knowledge articles created. Based on the monitored data, the feature module can rebalance expertise tracks of the gamification system to favor creating articles.

The recommended features 320 are features of the model that are not required, but are recommended to the customer to assist in goal achievement. Because the recommended features 320 are not required, one or more of the recommended features 320 and/or sub-features thereof can be de-selected, such as, for example, via the on/off toggle. In various examples, the feature module 316 may determine that certain features are recommended based on historical data. For example, historical data may indicate a moderate goal achievement rate in an internal community to increase participation by including levels of participation. Based on the goal achievement rate of previous models, the feature module 316 may determine that the levels of participation feature is a recommended feature 320. For another example, historical data may indicate a 10% increase in participation in a similar models including the levels of participation feature. Based on the increased participation in other similar models, the feature module 316 may determine that the levels of participation feature is recommended.

The optional features 322 are features of the model that are not required or recommended, but may be desirable options to the customer. In some examples, the optional features 322 can be features that may assist in goal achievement. In some examples, the optional features 322 can be subjectively pleasing. Because the recommended features 320 are not required, one or more of the recommended features 320 and/or sub-features thereof can be de-selected, such as, for example, via the on/off toggle. In various examples, the feature module 316 may determine that certain features are optional based on historical data. For example, historical data may indicate a 5% increase in participation in a similar models including tutorial awards feature. Based on the increased participation in other similar models, the feature module 316 may determine that the tutorial awards feature is optional.

In various examples, the adaptive wizard framework 300 can include a visualization module 324. The visualization module 324 receives inputs of the required features 318, and selected recommended features 320 and/or optional features 322. The visualization module 324 processes the inputs from the feature module 316, and provides one or more visualizations for the customized gamification system. In various examples, the one or more visualizations can be based on and/or related to the required features 318, the selected recommended features 320, and/or the selected optional features 322. For example, the visualization module 324 may generate and display a visualization for a leaderboard in a community participation scenario in which a competition feature is selected. In some examples, the one or more visualizations can include other visual features of the gamification system, such as a header, a footer, a showcase, margins, colors, fonts, and the like.

In various examples, the one or more visualizations can be selectable via the user interface, such as, for example, via a select or add button, or by providing the code to copy and paste the visualizations onto a website. In some examples, the one or more visualizations can be automatically selected by the adaptive wizard framework 300 via the visualization module 324. In such examples, the one or more visualizations can be included in the customized gamification system.

In some examples, the adaptive wizard framework can include a building module 326. The building module 326 can receive input from the scenario module, the goal-defining module 308, the feature module 316, and/or the visualization module 324. In various examples, the building module 326 can process the inputs, and build a customized gamification system for the customer. The customized gamification system can be built and/or designed to achieve one or more goals of the customer and/or the customer enterprise with regard to user behavior patterns.

In various examples, the building module 326 can send the customized gamification system to the customer. The customized gamification system can be sent to the customer via a designated website and/or URL of the customer, via one or more memories (e.g., a computer readable storage device), and/or other means of providing a gamification system to a customer. In some examples, the designated website and/or URL can be provided by the customer, such as via the user interface. For example, the customized gamification system can be published on a website of the user. The customized gamification system can thus be implemented by the customer to recognize and award desired behavior patterns and boost engagement in order to achieve the one or more goals of the customer.

Example Interfaces

Figure 4:
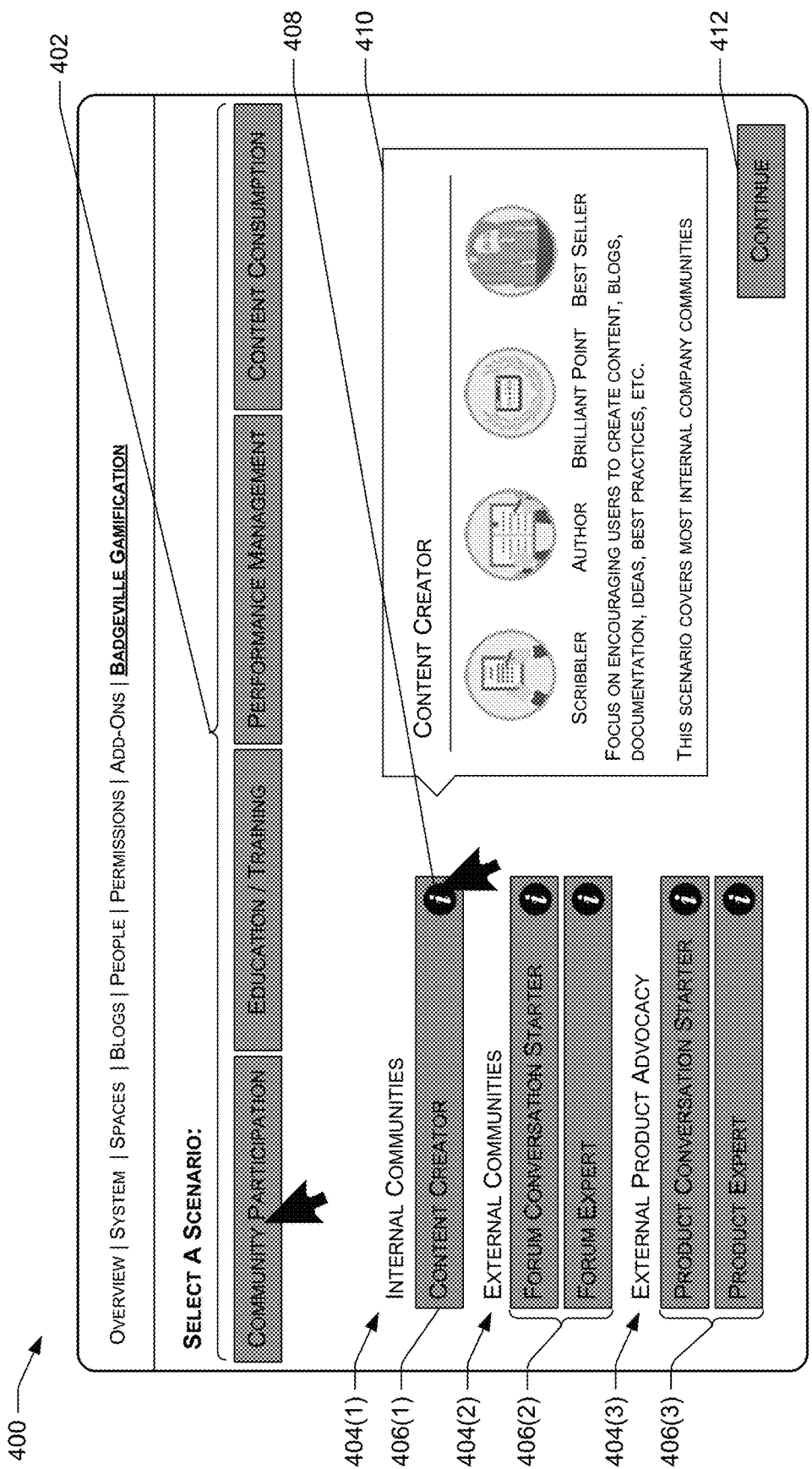
FIG. 4 illustrates an example use case selection interface for use in generating a gamification system.

FIG. 4 illustrates an example scenario selection interface 400 of an adaptive wizard for use in generating a gamification system. The scenario selection interface 400 includes a selection component in which a scenario 402 can be selected. The selection component provides a means by which the adaptive wizard can receive a scenario (e.g., use case) for a focus of the gamification system. The scenario 402 can include community participation (e.g., encourage participation in and contributions to online communities to improve the quality of conversations and interactions), education/training (e.g., encourage studying and progressing through an educational program), performance management (e.g., encourage increased performance), content consumption (e.g., encouraging an increase in the amount of content consumed over time), an event (e.g., encourage behaviors with respect to a one-time event) and the like.

In various examples, the scenario selection interface 400 can include a sub-scenario 404. In such examples, the sub-scenario 404 can be used by the adaptive wizard to tune the design of the gamification system. Additionally, the sub-scenario 404 can be used by the adaptive wizard to generate a series of questions for further tuning of the design of the gamification system. In the illustrative example, the scenario 402 includes three sub-scenarios. In some examples, the scenario 402 can include a greater or lesser number of sub-scenarios.

By way of example and not limitation, a community participation scenario 402 can include an internal community sub-scenario 404(1), an external community sub-scenario 404(2), and an external product advocacy sub-scenario 404(3). The sub-scenarios 404 can include options 406 for narrowing a focus of the use case. In the illustrative example, the internal community subset 404(1) includes a content creator option 406(1), selectable to focus on encouraging users to behave a certain way. For example, the content creator option 406(1) may encourage users to create content, share articles, blog, generate ideas, and share best practices. In some examples, the content creator option 406 may be selected for a customer operating an internal company community. As shown in FIG. 4, the external community sub-scenario 404(2) includes forum options 406(2) (e.g., a forum conversation starter and a forum expert), and the external product advocacy sub-scenario 404(3) includes product options 406(3) (e.g., a conversation starter and a product expert). In other examples, the sub-scenario may include a greater or lesser number of options.

In some examples, the options 406 can include an informational link 408 to provide explanatory information about a particular option. In other examples, the explanatory information can be presented upon selection of the scenario 402, the sub-scenario 404, and/or the option 406. In various examples, the selection can be a mouse-over, clickable event, and/or any other means of selection on a user interface. The explanatory information can include details and/or a focus of a particular scenario and/or the corresponding sub-scenarios. In the illustrative example, based on a selection of the informational link 408, a content box 410 is presented on the scenario selection interface 400. The content box 410 provides details regarding the content creator option 406(1) of the internal community sub-scenario 404(1), e.g., the content creator focus is on encouraging users to create content, blogs, documentation, ideas, best practices, etc. in an internal company community.

In various examples, the scenario selection interface 400 can include a progression selection 412. The progression selection 412 saves the selected scenario 402, sub-scenario 404 and/or the option 406 to an adaptive wizard framework, such as adaptive wizard framework 300. Additionally, the progression selection 412 progresses the customer to a next interface to continue to build the customized gamification system. In the illustrative example, the progression selection 412 includes a "Continue" selection. In other examples, the progression selection 412 can include a "Next" selection, a "Forward" selection, or other indication of moving to a subsequent interface of the adaptive wizard.

In some examples, the scenario selection interface 400 can include a regression selection. The regression selection can allow a user to go back to a previous interface. In various examples, the regression selection can save the selected data on the scenario selection interface 400 prior to regressing to a previous interface. The regression selection can include a "Back" selection, a "Previous" selection, or other indication of moving to a preceding interface of the adaptive wizard.

Figure 5:
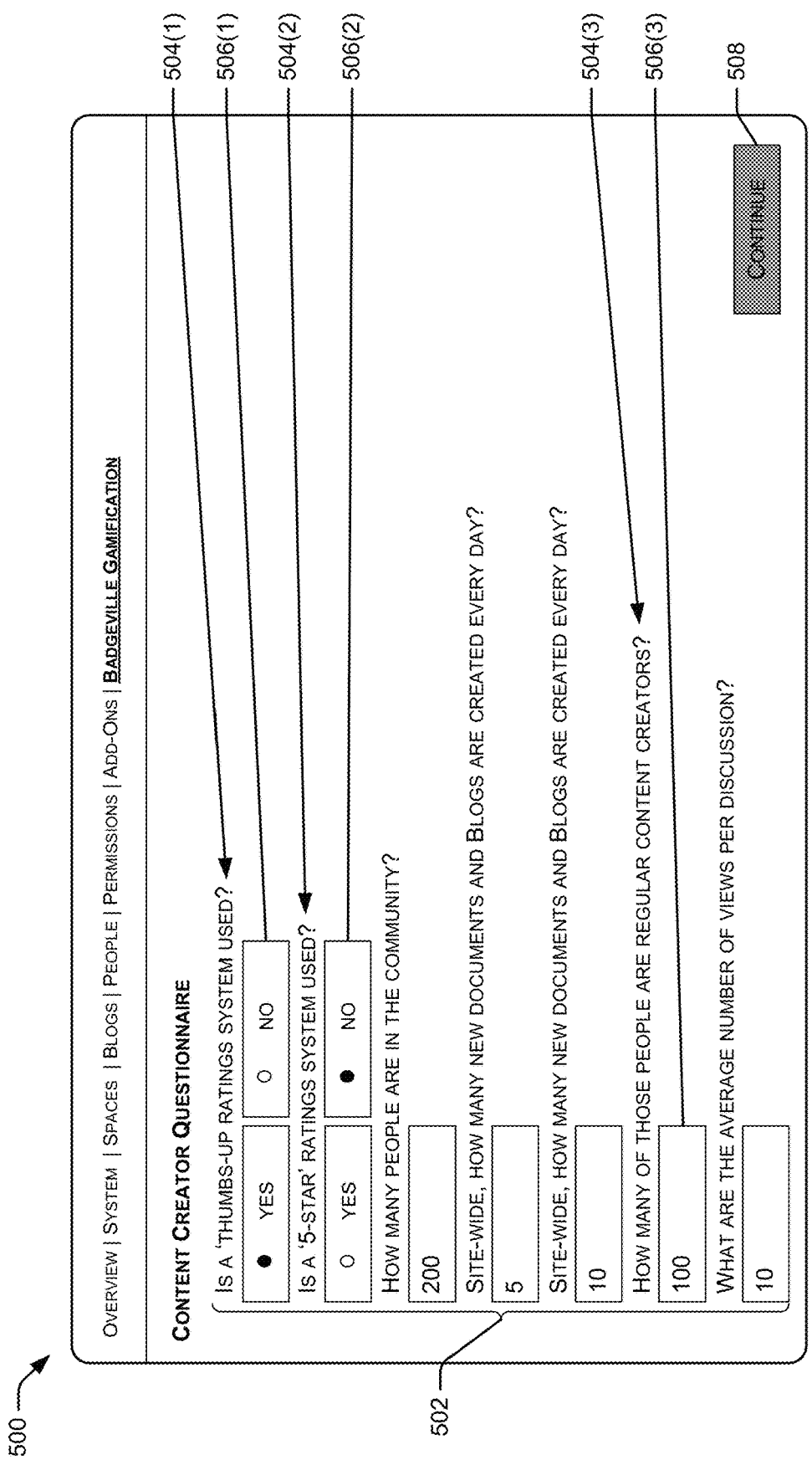
FIG. 5 is an example content creator questionnaire interface for use in generating a gamification system.

FIG. 5 is an example content creator questionnaire interface 500 of an adaptive wizard for use in generating a gamification system. The content creator questionnaire interface 500 is used by the adaptive wizard framework to determine a customer and/or customer enterprise goal, a required gamification system feature, recommended and/or optional gamification system features, and/or gamification system visualizations.

In various examples, the adaptive wizard can process the inputs from a scenario selection interface, such as scenario selection interface 400, and can determine one or more questions to present to a customer. Additionally or alternatively, the adaptive wizard can monitor customer and/or user behavior on a customer website via a network, and determine the one or more questions to present to a customer via the content creator questionnaire interface 500.

In various examples, the content creator questionnaire interface 500 can include an input area 502. The input area 502 can include questions 504 and answer blocks 506. The questions 504 can include broad and/or narrow questions. The answer blocks 506 can include yes or no answer blocks, such as answer block 504(1), multiple choice answer blocks, and/or fill-in answer blocks, such as answer block 506(3).

In some examples, the input area 502 can include a series of questions 504. In such an example, a first question 504(1) may be displayed in the input area 502. The first question 504(1) can be a broad question regarding the general scenario selected in a scenario selection interface. Based at least in part on an answer to the question 504(1) provided in answer block 506(1), the content creator questionnaire interface 500 can present a second question 504(2). In some examples, the second question 504(2) can be narrower in scope than the first question 504(1). Thus, the series of questions 504 can be an iterative series of questions used to determine one or more goals of the customer and/or the customer enterprise and/or to tune the gamification system (e.g., determine the appropriate category and/or model).

In some examples, the input area can include a list of questions 504, and answer blocks 506. In such examples, the content creator questionnaire interface 500 can present the list of questions 504 and the answer blocks 506. Based on the answers provided in the answer blocks 506, the adaptive wizard can determine one or more goals of the customer and/or the customer enterprise and/or tune the gamification system.

In various examples, the content creator questionnaire interface 500 can include a progression selection 508. The progression selection 508 saves the answers provided in answer blocks 506 to an adaptive wizard framework, such as adaptive wizard framework 300. Additionally, the progression selection 508 progresses the adaptive wizard to a next interface to continue to build the gamification system. In the illustrative example, the progression selection 508 includes a "Continue" selection. In other examples, the progression selection 508 can include a "Next" selection, a "Forward" selection, or other indication of moving to a subsequent interface of the adaptive wizard.

In some examples, the content creator questionnaire interface 500 can include a regression selection. The regression selection can allow a user to go back to a previous interface, such as to the scenario selection interface 400. In various examples, the regression selection can save the selected data on the content creator questionnaire interface 500 prior to regressing to a previous interface. The regression selection can include a "Back" selection, a "Previous" selection, or other indication of moving to a preceding interface of the adaptive wizard.

Figure 6:
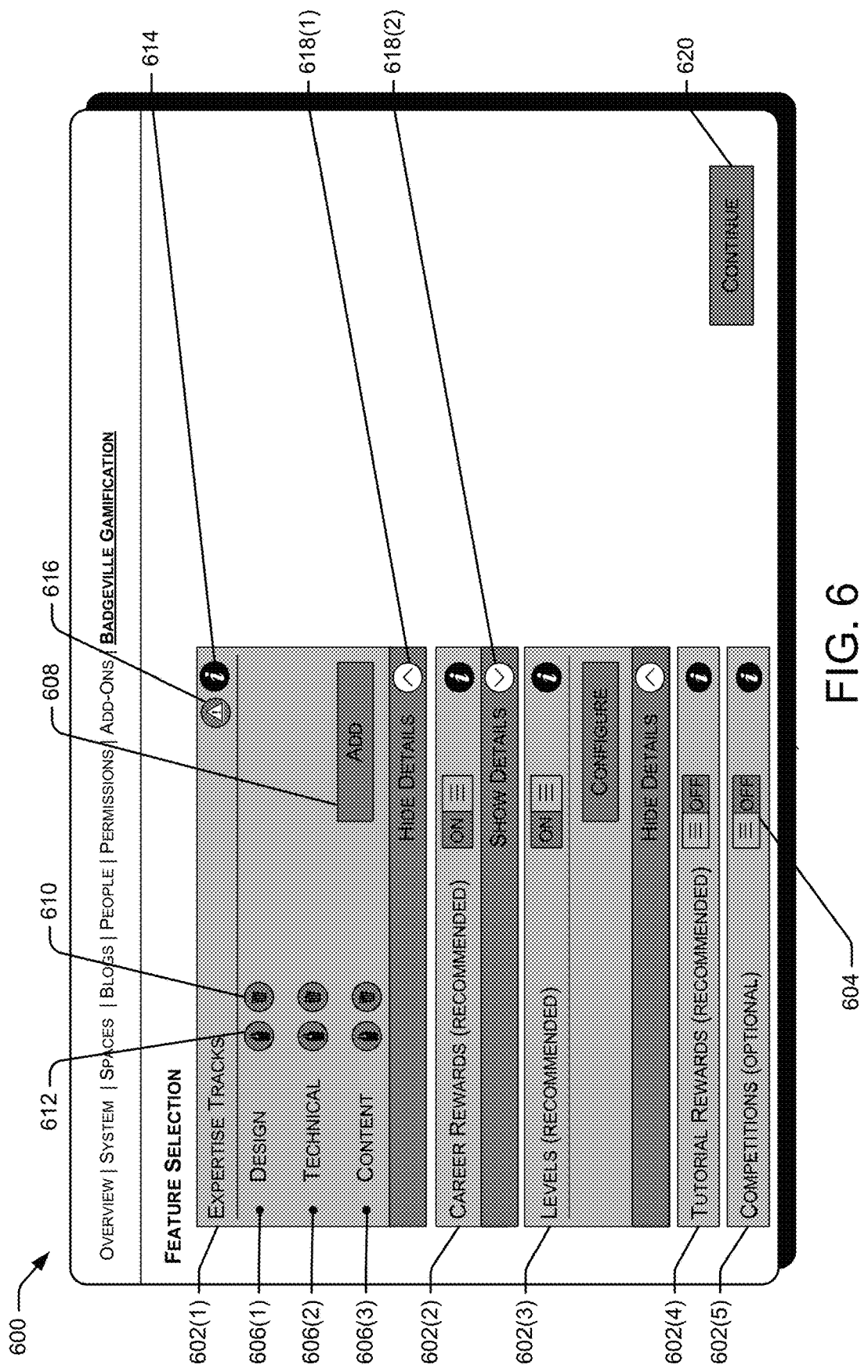
FIG. 6 is an example feature selection interface for use in generating a gamification system.

FIG. 6 is an example feature selection interface 600 of an adaptive wizard for use in generating a gamification system. In various examples, the feature selection interface 600 can include one or more features 602. As described above with respect to FIG. 3, the one or more features 602 can include required features, recommended features, and/or optional features.

The required features are the features of the model that are deemed necessary in achieving the customer's goals. The illustrative example includes a community scenario with a defined goal of user participation. As such, the adaptive wizard determines that an expertise tracks feature 602(1) is a required feature to encourage participation. In some examples, the feature selection interface 600 can include a greater or lesser number of required features.

In various examples, the adaptive wizard may determine that certain features are required features based on historical data stored in data store internal and/or external to an adaptive wizard framework, such as adaptive wizard framework 300. For example, historical data may indicate a high goal achievement rate in an internal community to increase participation by including expertise tracks. Based on the goal achievement rate of previous models, the adaptive wizard may determine that the expertise tracks feature 602(1) is a required feature. For another example, historical data may indicate a 15% increase in participation in a similar models including the expertise tracks feature 602(1). Based on the increased participation in other similar models, the adaptive wizard may determine that the expertise tracks feature 602(1) is a required feature.

The recommended features are features of the model that are not required, but are recommended to the customer to assist in goal achievement. In the illustrative example, a career rewards feature 602(2), a levels feature 602(3), and a tutorial rewards feature 602(4) are recommended features. In some examples, the feature selection interface 600 can include additional and/or different recommended features, as determined by the adaptive wizard. Thus, the feature selection interface 600 can include a greater or lesser number of recommended features. Because the recommended features are not required, one or more of the recommended features and/or sub-features thereof can be de-selected, such as, for example, via the on/off toggle 604.

In various examples, the adaptive wizard may determine that certain features are recommended based on historical data. For example, historical data may indicate a moderate goal achievement rate in an internal community to increase participation by including levels of participation. Based on the goal achievement rate of previous models, the adaptive wizard may determine that the levels of participation feature is a recommended feature. For another example, historical data may indicate a 10% increase in participation in a similar models including the levels of participation feature. Based on the increased participation in other similar models, the adaptive wizard may determine that the levels of participation feature is recommended.

The optional features are features of the model that are not required or recommended, but may be desirable options to the customer for implementation. In various examples, the optional features can be features that may assist in customer goal achievement. In some examples, the optional features can be aesthetically pleasing. Because the recommended features are not required, one or more of the recommended features and/or sub-features thereof can be de-selected, such as, for example, via the on/off toggle 604. In various examples, the adaptive wizard may determine that certain features are optional based on historical data. For example, historical data may indicate a 5% increase in participation in a similar models including tutorial rewards feature. Based on the increased participation in other similar models, the adaptive wizard may determine that the tutorial rewards feature is optional.

In various examples, the features can include sub-features 606 to configure the respective features via the user interface. The sub-features 606 can provide a means by which the adaptive wizard can tune the feature of the gamification system. In various examples, the sub-features 606 can include aspects of the feature. For example, the sub-features of the levels feature 602(3) can include a list of the various different levels, such as novice, lurker, student, citizen, veteran, champion, sage, and the like. In the illustrative example, the sub-features 606 include areas of expertise in the community. As illustrated, the areas of expertise in the community can include a design sub-feature 606(3), a technical sub-feature 606(3), and a content sub-feature 606(3). In some examples, the feature 602 can include a greater or lesser number of sub-features 606. In such examples, the sub-features 606 can be added by selecting an add selection 610 and/or deleted by selecting a delete icon 610. In various examples, the sub-features 606 can be configurable and/or edited. In the illustrative example, the sub-features 606 can be configured and/or edited by selecting an edit icon 612.

In various examples, the feature 602 and/or the sub-features 606 can include explanatory information regarding the respective feature and/or sub-feature via an information icon 614. The information icon 614 can be selectable, such as by a mouse-over or clickable link. The explanatory information can include details and/or benefits of the respective feature 602 and/or sub-feature 606.

Additionally, the features 602 can include a warning icon 616. The warning icon 616 can indicate that there are errors in the configuration of the feature. For example, the warning icon 616 may be presented before a track is configured in the required expertise tracks feature 602(1). In some examples, the warning icon 616 may be presented on a feature 602 that is toggled on via the on/off toggle 604, but has not yet been verified and/or configured. In various examples, the warning icon 616 can disappear when the track is verified and/or configured.

In various examples, the features 602 can include an expansion selection 618. The expansion selection may provide a means by which the details of the feature 602, such as the sub-features 606 can be hidden and/or displayed. In the illustrative example, the sub-features 606(1)-606(3) are displayed, and may be hidden by selection of the expansion selection 618(1). For another example, the details of the career rewards feature 602(2) are not displayed. In such an example, the details and/or sub-features 606 of the career rewards feature 602(2) can be displayed by selecting the corresponding expansion selection 618(2).

In various examples, the feature selection interface 600 can include a progression selection 620. The progression selection 620 saves the selected features of the one or more features 602 to an adaptive wizard framework, such as adaptive wizard framework 300. Additionally, the progression selection 620 progresses the adaptive wizard to a next interface to continue to build the gamification system. In the illustrative example, the progression selection 620 includes a "Continue" selection. In other examples, the progression selection 620 can include a "Next" selection, a "Forward" selection, or other indication of moving to a subsequent interface of the adaptive wizard.

In some examples, the feature selection interface 600 can include a regression selection. The regression selection can allow a user to go back to a previous interface, such as to the content creator questionnaire interface 500. In various examples, the regression selection can save the selected data on the feature selection interface 600 prior to regressing to a previous interface. The regression selection can include a "Back" selection, a "Previous" selection, or other indication of moving to a preceding interface of the adaptive wizard.

Figure 7:
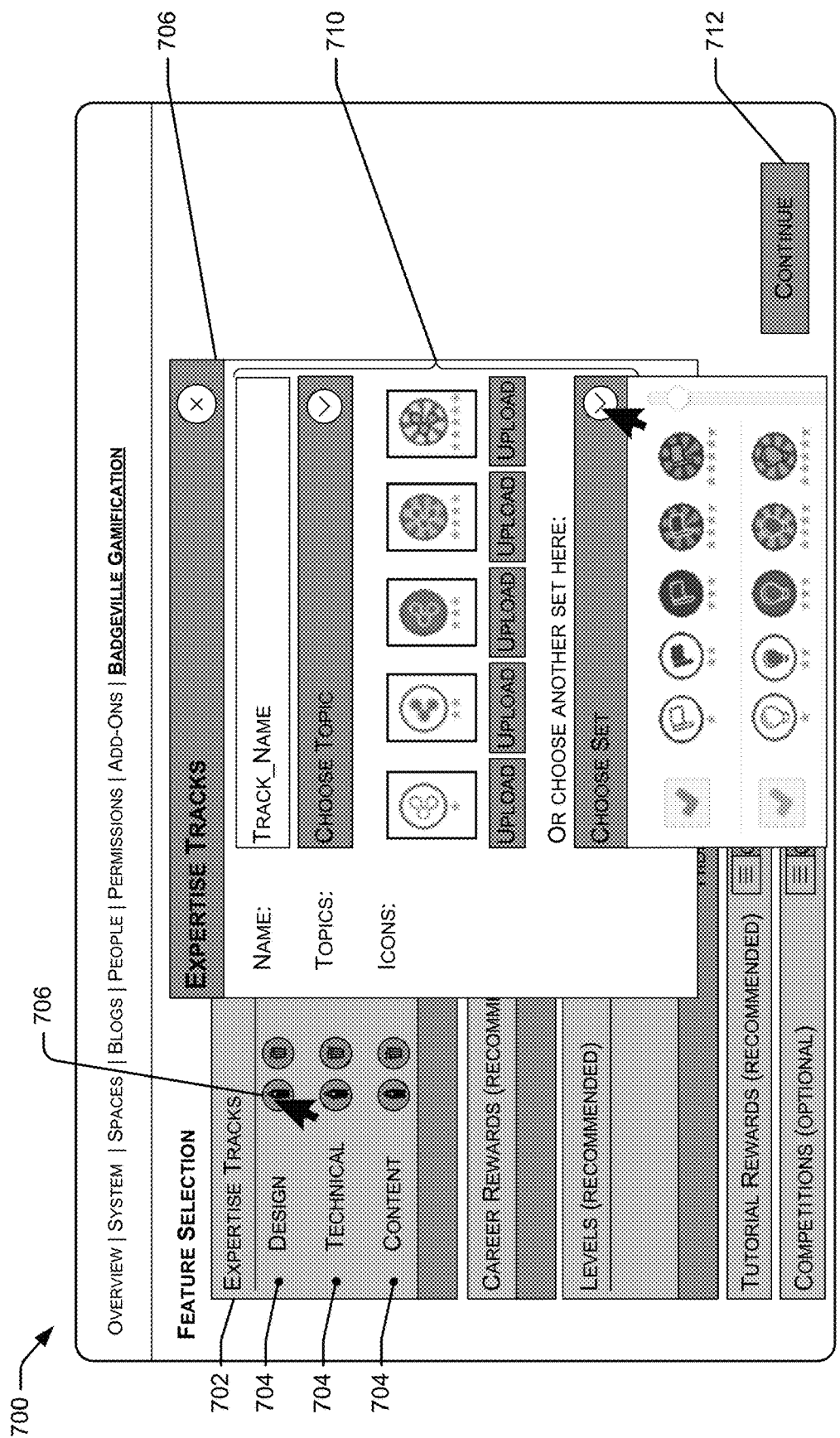
FIG. 7 is an example feature selection interface for use in generating a gamification system, similar to that depicted in FIG. 6, with an expertise track feature being configured.

FIG. 7 is an example feature selection interface 700 of an adaptive wizard for use in generating a gamification system, similar to that depicted in FIG. 6, with an expertise track feature 702 being configured.

As discussed above with regard to FIG. 6, the expertise track feature 702, such as expertise track feature 602(1) can be configurable. In various examples, the expertise track feature 702 can be configured via an expertise track configure icon. In some examples, the sub-features 704 can be individually configurable, such as via an edit icon 706.

In various examples, the feature selection interface 700 can display an editing box 708. The editing box 708 can include one or more input boxes 710. The input boxes 710 can include fill-in boxes, menus (e.g., displayed and/or drop-down), and the like. In the illustrative example, the user input boxes include a name selection box, a topic selection box, and an icon selection box. In various examples, editing box 708 can include a greater or fewer number of input boxes 710.

Figure 8:
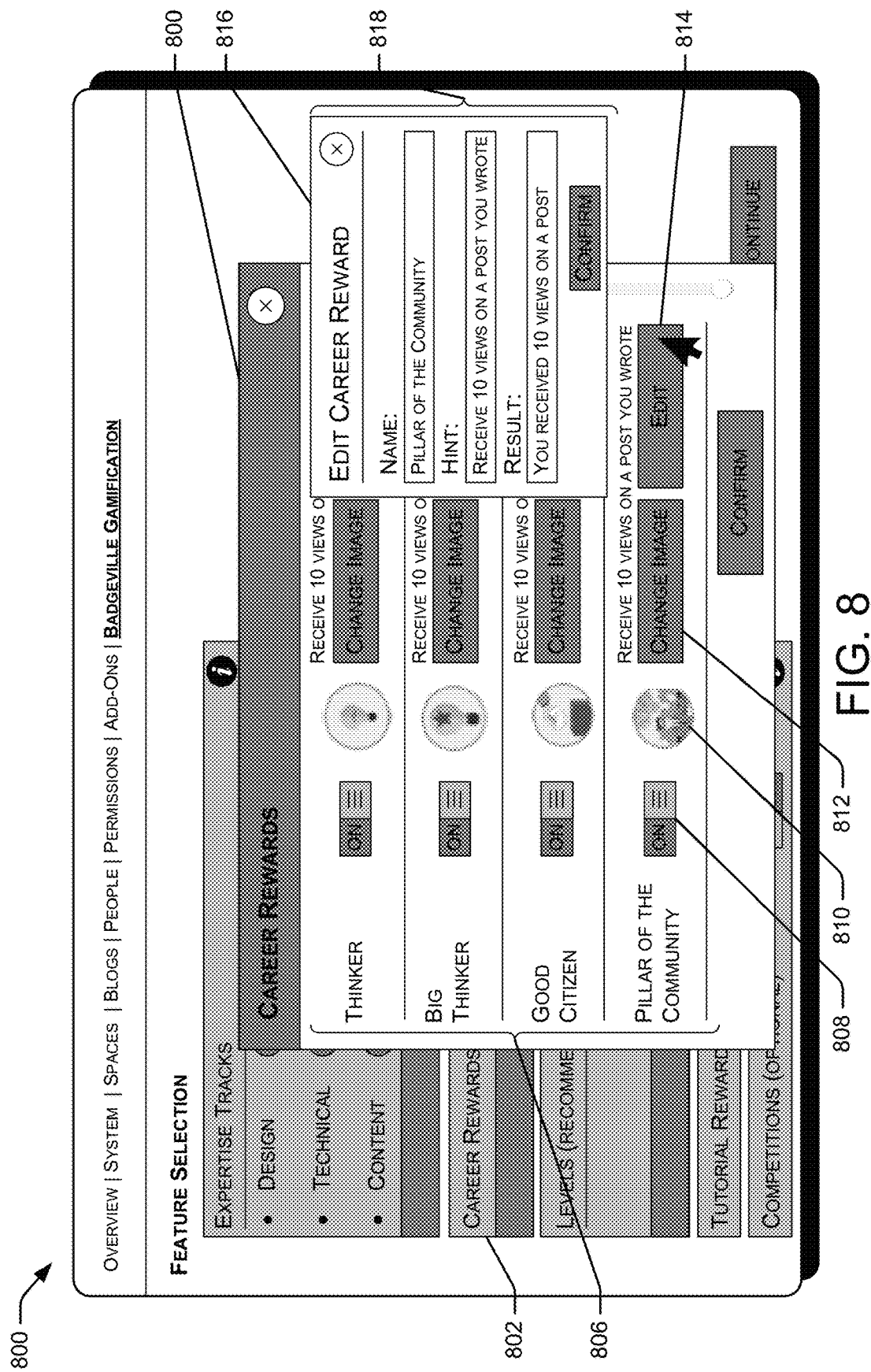
FIG. 8 is an example feature selection interface for use in generating a gamification system, similar to those depicted in FIGS. 6 and 7, with a career rewards feature being configured.

FIG. 8 is an example feature selection interface of an adaptive wizard for use in generating a gamification system, similar to those depicted in FIGS. 6 and 7, with a career rewards feature 702 being configured. In various examples, the career rewards feature 802, such as career rewards feature 602(2) can be configured upon selection of an edit icon. In some examples, the career rewards feature 702 can be configured by toggling a career rewards on/off toggle to an on position.

In the illustrative example, the career reward feature 702 includes the career reward sub-features thinker, big thinker, good citizen and pillar of the community. Other examples may include the illustrated career reward sub-features and/or other career reward sub-features, such as scribbler, author, brilliant point, best seller, conversation starter, and investigator.

In various examples, the feature selection interface 800 can display an editing box 804 for the career rewards feature 802. The editing box 804 can include names of the career rewards sub-features 806, on/off toggles 808, and images 810. In various examples, the career reward sub-features 806 can individually be de-selected by toggling the respective on/off toggle 808 to an off position. In some examples, the image 810 corresponding to an individual career reward sub-feature 806 can be edited, such as by the change image selection 812.

Additionally, the editing box 804 can include an edit selection 814 for the career reward sub-features 806. The edit selection 814 can to provide an interface to edit the respective career reward sub-feature 806. In the illustrative example, the pillar of the community career reward sub-feature 806 is selected, and an edit career reward box 816 is displayed. In the illustrative examples, the edit career reward box 816 includes three editable aspects 818 of the sub-feature 806 (e.g., a name, a hint and a result). In some examples, the edit career reward box 816 can include a greater or lesser number of editable aspects 818 of the sub-feature 806.

Figure 9:
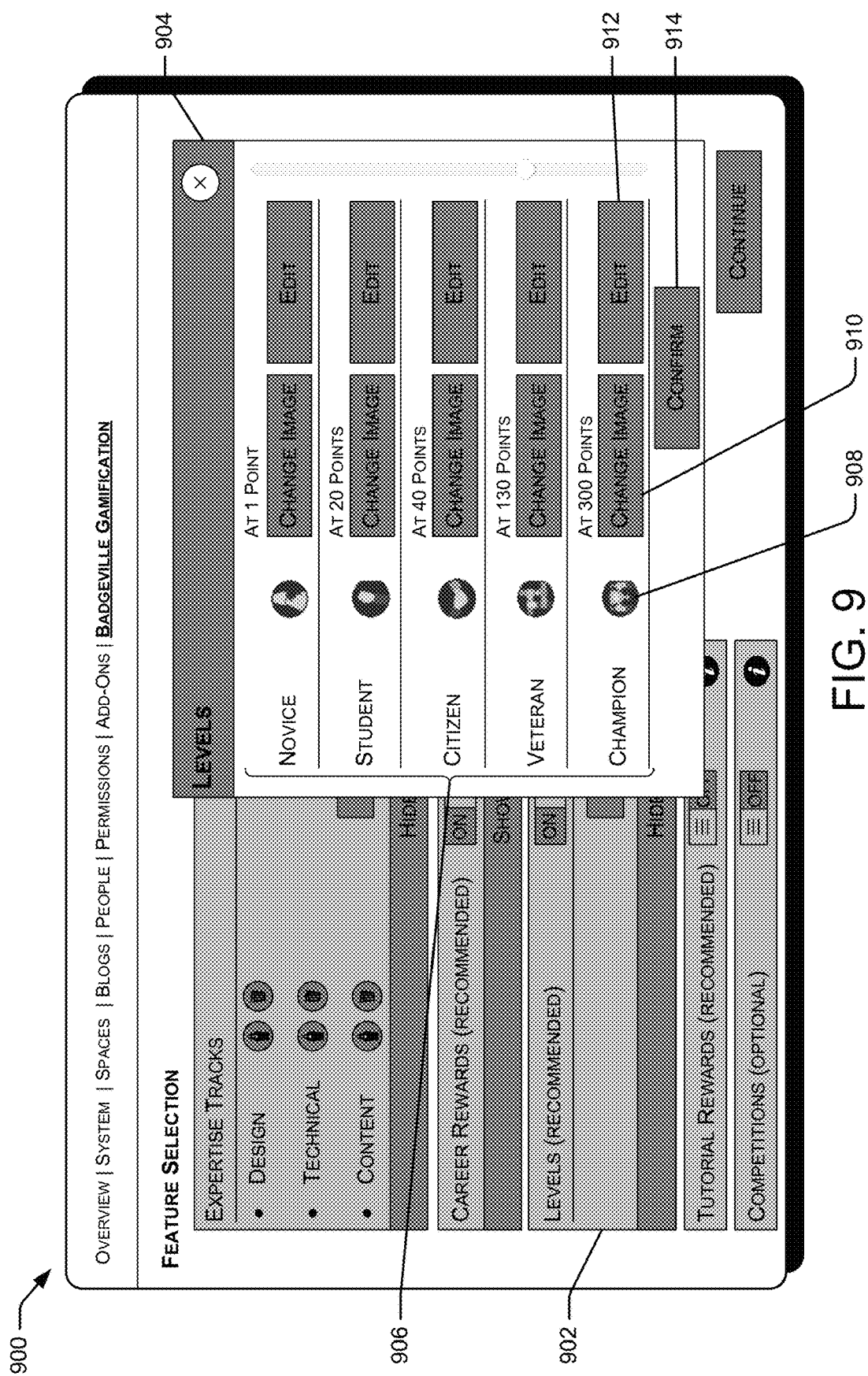
FIG. 9 is an example feature selection interface for use in generating a gamification system, similar to those depicted in FIGS. 6-8, with a levels feature being configured.

FIG. 9 is an example feature selection interface 900 of an adaptive wizard for use in generating a gamification system, similar to those depicted in FIGS. 6-8, with a levels feature 902 being configured. In various examples, the levels feature 902, such as levels feature 602(3), can be configured upon selection of an edit icon. In some examples, the levels feature can be configured by toggling a levels feature on/off toggle to an on position.

In various examples, the feature selection interface 900 can display an editing box 904 for the levels feature 902. In the illustrative example, the editing box 904 includes level names 906, and corresponding images 908. In other examples, the editing box 904 can include a greater or lesser number of aspects of the levels. In some examples, the image 908 corresponding to level name 906 can be edited, such as by the change image icon 910.

Additionally, the editing box 904 can include an edit icon 912 for the level name 906. The edit icon 912 can provide an interface to edit aspects of the respective level, such as the level name 906, a point total associated with the respective level, and the like. In some examples, the editing box 904 can also include an on/off toggle to disable one or more of the levels.

In various examples, the editing box 904 can include a confirmation icon 914. The confirmation icon 914 can save any changes made to the level, and can include the verified and/or configured levels to the gamification system.

Figure 10:
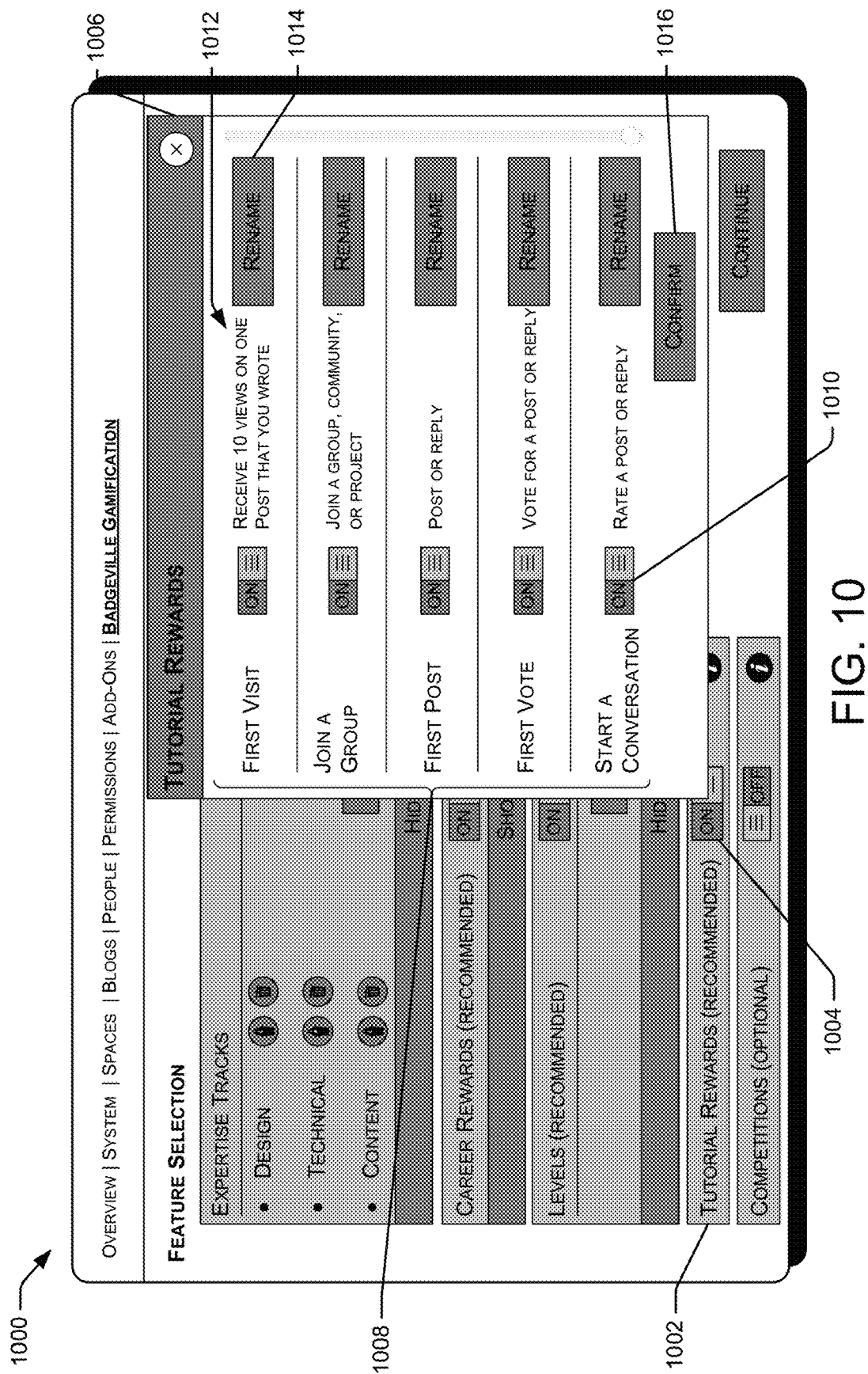
FIG. 10 is an example feature selection interface for use in generating a gamification system, similar to those depicted in FIGS. 6-9, with a tutorial rewards feature being configured.

FIG. 10 is an example feature selection interface 1000 of an adaptive wizard for use in generating a gamification system, similar to those depicted in FIGS. 6-9, with a tutorial rewards feature 1002 being configured. In various examples, the tutorial rewards feature 1002, such as tutorial rewards feature 602(4), can be configured upon selection of an edit icon. In some examples, the tutorial rewards feature 1002 can be configured by toggling a tutorial rewards feature on/off toggle 1004 to an on position.

In the illustrative example, the tutorial rewards feature 1002 includes the tutorial rewards sub-features 1008 of first visit, join a group, first post, first vote, and start a conversation. Other examples may include the illustrated sub-features and/or other tutorial reward sub-features, such as, join a community/project, first reply, vote for a post, complete profile, add avatar, follow someone, follow thread, and use search.

In various examples, the feature selection interface 1000 can display an editing box 1006 for the tutorial rewards feature 902. In the illustrative example, the editing box 1006 includes names of the tutorial reward sub-features 1008, sub-feature on/off toggles 1010, and sub-feature descriptions 1012. In other examples, the editing box 1006 can include a greater or lesser number of aspects of the tutorial reward sub-features.

In the illustrative example, the editing box 1006 includes a rename icon 1014 for the tutorial reward sub-features 1008. The rename icon 1014 provides an interface to edit the name of the respective tutorial reward sub-feature 1008. Additionally or alternatively, the editing box can include an edit icon. The edit icon provides an interface to edit aspects of the tutorial reward sub-features 1008, such as the name, the description, an image, and the like.

In various examples, the editing box 1006 can include a confirmation icon 1016. The confirmation icon 1016 can save any changes made to the tutorial reward sub-features 1008, and can include the verified and/or configured tutorial reward sub-features 1008 to the gamification system.

Figure 11:
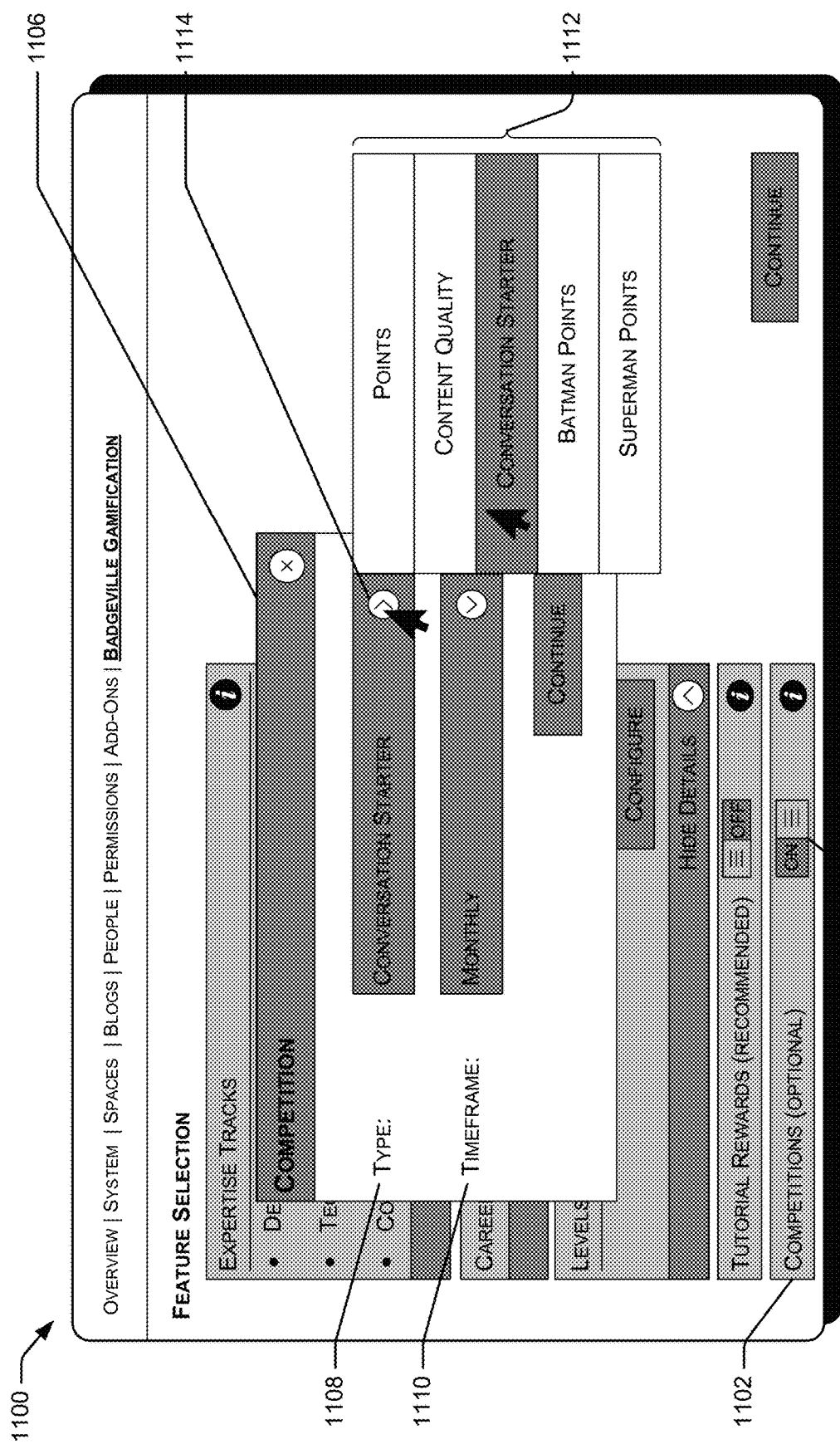
FIG. 11 is an example feature selection interface for use in generating a gamification system, similar to those depicted in FIGS. 6-10, with a competitions feature being configured.

FIG. 11 is an example feature selection interface of an adaptive wizard for use in generating a gamification system, similar to that depicted in FIGS. 6-10, with a competitions feature 1102 being configured. In various examples, the competitions feature 1102, such as competitions feature 602(5), can be configured upon selection of an edit icon. In some examples, the competitions feature 1102 can be configured by toggling a competitions feature on/off toggle 1104 to an on position.

In various examples, the competitions feature 1102 can be edited via an editing box 1106. As illustrated in FIG. 11, the editing box 1106 can include two editable competition sub-features, a type 1108 and a timeframe 1110. In other examples, the editing box 1106 can include a greater or fewer number of competition sub-features. The competition sub-features can be edited by selecting from a menu and/or filling-in values.

In some examples, the sub-features can be edited by selecting an edit icon, and changing the sub-feature. In the illustrative example, the type 1108 sub-feature can be edited by selecting from a drop-down menu 1112. In such an example, the drop-down menu 1112 can be displayed upon selection of a menu arrow 1114. As show, drop-down menu 1112 can include a points, content quality, conversation starter, batman points, and superman points type of competition. In other examples, the drop-down menu 1112 can include different and/or more or less types of competitions to choose from. For example, the type 1108 sub-feature drop-down menu 1112 can include votes, good ratings, starting discussions, each expertise track sub-feature category, and the like.

Additionally, the timeframe 1110 sub-feature can be edited by selecting a menu arrow, and selecting an option in a drop down menu. The timeframe sub-feature can include options such as monthly, weekly, daily, quarterly, annually, and/or other time intervals.

Figure 12:
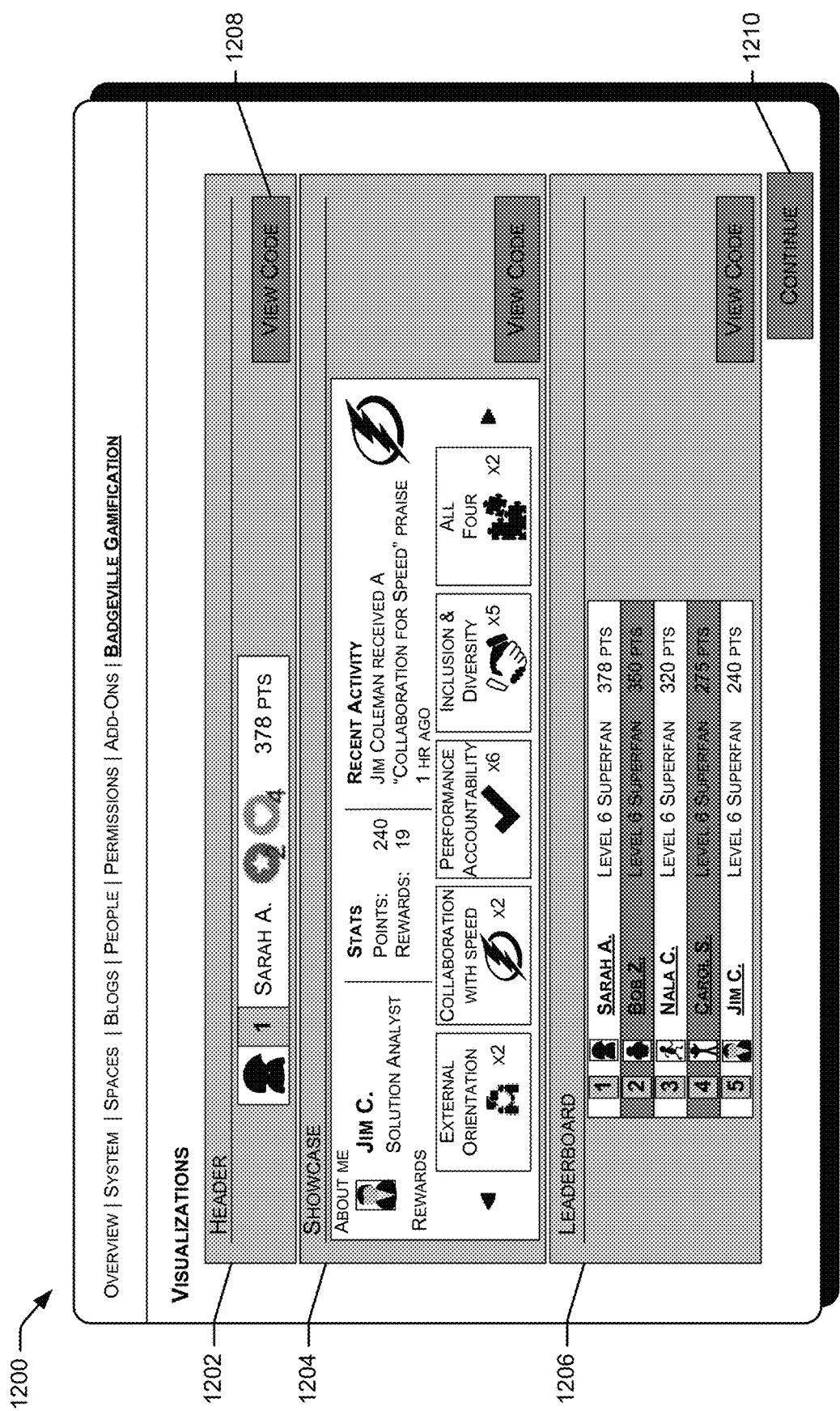
FIG. 12 is an example visualizations interface for use in selecting visualizations for a gamification system.

FIG. 12 is an example visualization interface 1200 of an adaptive wizard for use in selecting visualizations for a gamification system. The visualizations interface 1200 provides a means by which certain visualizations can be selected for the customized gamification system.

In the illustrative example, the visualization interface 1200 includes a header visualization 1202, a showcase 1204, and a leaderboard 1206. In some examples, the visualization interface 1200 can include other visualizations applicable to the customized gamification system. In various examples, the visualizations can provide visibility into multiple features. For example, the showcase 1204 can include a couple of unit currencies, a personal stream and career awards.

In various examples, the visualizations, such as the header visualization 1202, the showcase visualization 1204, and the leaderboard visualization 1206, can be selected for a customized gamification system via an add icon. Based on the selection via the add icon, the adaptive wizard can include the visualizations in the gamification system. In some examples, the visualizations can be selected via a view code icon 1208. Based on the selection via the view code icon 1208, a window of code may be presented on the user interface. The code in the window of code may be copied and pasted into the gamification system.

In the illustrative example, the header visualization 1202 includes an avatar, a leaderboard standing, a user name, icons, and points. In other examples, the header visualization 1202 can include greater or fewer visualizations of similar and/or different type.

The showcase visualization 1204 can include information about a particular user, to include an avatar, a position (e.g., job title and/or description), statistics (e.g., points earned, awards earned, etc.), recent activity, and/or awards earned. In various examples, the awards earned can include the respective award name, icon and/or an indication of the number earned.

The leaderboard visualization 1206 can be based on a point total (e.g., highest point total is #1). Additionally or alternatively, the leaderboard visualization 1206 can be based on a total number of earned awards. In the illustrative example, the leaderboard visualization 1206 can include a ranking, an avatar, a user name, a level number and name, and a point total. In other examples, the leaderboard visualization 1206 can include greater or fewer visualizations of similar and/or different type.

In various examples, the visualization interface 1200 can include a progression selection 1210. The progression selection 1210 saves the selected visualizations to an adaptive wizard framework, such as adaptive wizard framework 300. Additionally, the progression selection 1210 progresses the adaptive wizard to a next interface, for example to a gamification completion interface. In some examples, the progression selection 1210 can progress the adaptive wizard to a completion phase, in which the gamification system is built and/or completed. In the illustrative example, the progression selection 1210 includes a "Continue" selection. In other examples, the progression selection 1210 can include a "Next" selection, a "Forward" selection, a "Complete"

selection, a "Build" selection, or other indication of moving to a subsequent phase of the adaptive wizard.

In some examples, the visualization interface 1200 can include a regression selection. The regression selection can allow a user to go back to a previous interface, such as to the feature selection interface 600. In various examples, the regression selection can save data on the visualization interface 1200 prior to regressing to a previous interface. The regression selection can include a "Back" selection, a "Previous" selection, or other indication of moving to a preceding interface of the adaptive wizard.

Illustrative Processes

Figure 13:
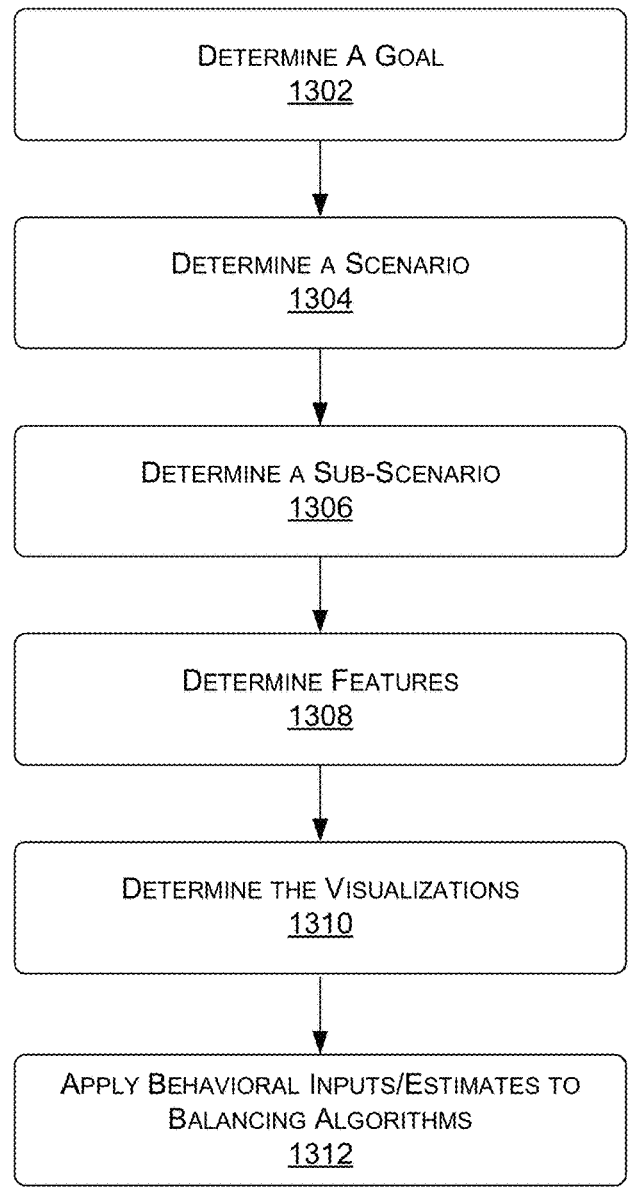
FIG. 13 is a flow diagram that illustrates a process flow of generating a gamification system.
Figure 14:
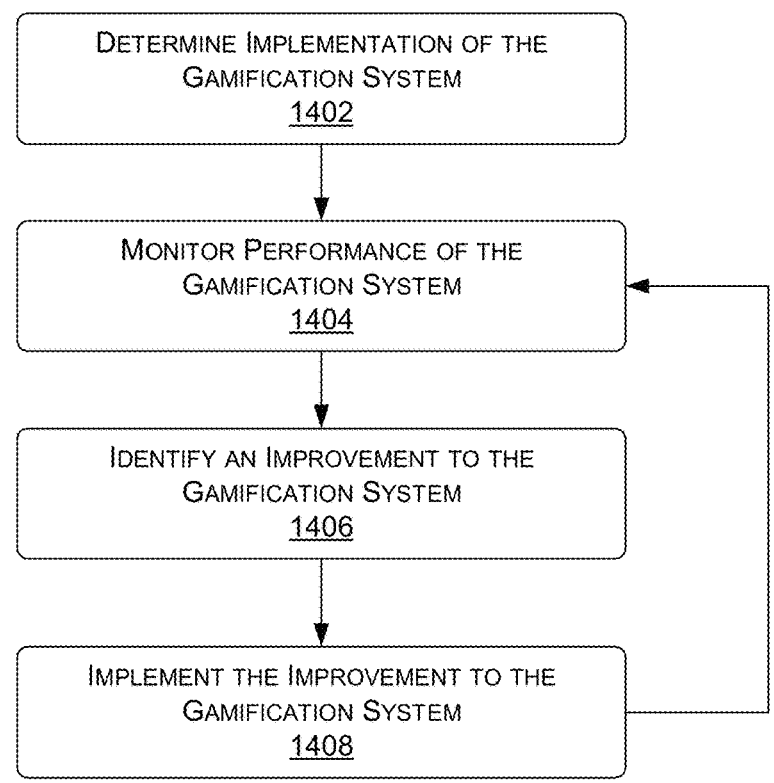
FIG. 14 is a flow diagram that illustrates a process flow of monitoring a gamification system and providing updates for the gamification system.

FIGS. 13 and 14 are flow diagrams depicting example processes for generating a gamification system and monitoring the gamification system, respectively. The operations of the example process are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

FIG. 13 is a flow diagram that illustrates a process flow 1300 of generating a gamification system.

At block 1302, the adaptive wizard can determine a goal of the customer with respect to a gamification system. In various examples, the goal can be determined by receiving input responses to questions via a user interface. The one or more goals can be based on particular user behaviors and/or behavior patterns associated with the customer enterprise (e.g., increase in participation, reviewed blog posts, training completed, amount of content consumed, etc.).

In various examples, the adaptive wizard can generate one or more questions based at least in part on the determined scenario. The one or more questions can be broad and/or narrow. In some examples, the one or more questions may be presented in a list form. In such examples, the one or more questions may be determined prior to presenting the questions to the customer via a user interface. In some examples, the one or more questions may be determined iteratively. In such examples, a first question may be presented to the customer via the user interface. Based at least in part on the input response to the first question, the adaptive wizard can determine a subsequent question. The adaptive wizard can receive the input response from the questions, and determine a goal for the customer and/or the customer enterprise. Additionally or alternatively, the adaptive wizard can determine a category (e.g., type) and/or a model for the gamification system.

Additionally or alternatively, the goal can be determined by monitoring actions on a customer website. The actions can include user actions and/or customer actions. The adaptive wizard can process the monitored actions and recognize an area which could be improved in the customer enterprise. In various examples, the adaptive wizard can define one or more customer goals based on the recognized area for improvement. For example, the adaptive wizard may monitor an employee training website and/or training program. The adaptive wizard may recognize a decrease in employee participation at a certain point in an employee training program. The adaptive wizard may process that information and identify a goal of encouraging participation in training program at the point in which it decreases.

At block 1304, an adaptive wizard determines a scenario for the customer. In various examples, the scenario may be determined based on customer input via a user interface. The scenarios can include a broad description of a field and/or enterprise in which the customer operates, such as, community participation, participation in general, education/training, performance management, content consumption, an event, or other over-arching scenario in which the customer operates In some examples, the scenario may be determined by monitoring one or more actions by a customer and/or users associated with the customer via a network interface. The actions can include user actions and/or customer actions. The adaptive wizard can process the monitored actions, and determine a scenario in which the customer may need to boost engagement. For example, a customer website may include community participation and training. The community participation, such as the number of views, articles shared, blog entries, etc. may be significant, however the participators may lag behind in meeting training objectives. Thus, the adaptive wizard may recognize that the scenario that needs improvement is the education/training scenario, and thus may determine the scenario for the gamification system is education/training.

At block 1306, the adaptive wizard can determine a sub-scenario for the gamification system. In various examples, the sub-scenario for the gamification system can be based at least in part on the goal determined at 1302 and/or the scenario determined at 1304.

At block 1308, the adaptive wizard can determine one or more features for the model which may assist the customer in achieving the defined goals. The adaptive wizard can identify required features, recommended features, and/or optional features. The required features can be features of the model that are deemed necessary to achieving the customer's goal. The recommended features can be features of the model that are not required, but are recommended to the customer to assist in goal achievement. The optional features can be features of the model that are not required or recommended, but may be desirable options to the customer for implementation.

In various examples, the one or more features may include sub-features. In some examples, the features and/or the sub-features can be configurable via a user interface. In some examples, the recommended features and/or the optional features can be de-selected, such as via an on/off toggle on a user interface.

The adaptive wizard can provide the features to the customer via the user interface. The adaptive wizard can determine the features for the gamification system based at least in part on customer selection of one or more of the provided features.

At 1310, the adaptive wizard can determine the visualizations for the gamification system. The visualizations can be based on the scenario, the goal, the appropriate model, and/or the features. In some examples, the visualizations can include visual features of the gamification system, such as a header, a footer, a showcase, a leaderboard, margins, colors, fonts, and the like.

In various examples, the visualizations can be selectable via the user interface, such as, for example, via a select or add button, or by providing the code to copy and paste the visualizations onto a website. In some examples, the visualizations can be automatically selected by the adaptive wizard based.

At 1312, the adaptive wizard can apply behavioral inputs and/or estimates to balancing algorithms to generate the gamification system for use by the customer to achieve the goal. The adaptive wizard can combine the input regarding the scenario, goal, appropriate model, features, and/or visualizations, and can generate the gamification system for the customer. The customized gamification system can be generated and/or designed to achieve one or more goals of the customer with regard to the behavioral inputs and/or estimates (e.g., user behavior patterns, estimates of behavior patterns based on historical data, etc.).

In various examples, the adaptive wizard can send the gamification system to the customer. The gamification system can be sent to the customer via a designated cite and/or URL of the customer, via one or more memories (e.g., a computer readable storage device), and/or other means of providing a gamification system to a customer. The gamification system can thus be implemented by the customer to recognize and award desired behavior patterns and boost engagement in order to achieve the one or more goals of the customer.

FIG. 14 is a flow diagram that illustrates a process flow 1400 of monitoring a gamification system and providing updates for the gamification system.

At block 1402, the adaptive wizard determines that a gamification system has been implemented.

At block 1404, the adaptive wizard monitors the performance of the gamification system. In some examples, the monitoring of the gamification system includes tracking progress data of users on the gamification system (e.g., training completed, levels achieved, and any other statistics relevant to the achievement of one or more customer goals). The progress data can include data specific to the customer's goal.

In various examples, the adaptive wizard can monitor the performance of multiple gamification systems in the same and/or similar scenarios and/or sub-scenarios. In some examples, the adaptive wizard can compare data across the same and/or the similar scenarios to track performance of a wide variety of users and/or customers.

The performance monitoring of one or more gamification systems can be continuous, periodic (e.g., once per week), and/or manually as directed. In various examples, the performance monitoring schedule can be determined by the adaptive wizard through a program manager. In such examples, the program manager can determine the nature by which the performance is monitored, the period interval (e.g., daily, weekly, monthly, etc.) and/or the manual monitoring.

At block 1406, the adaptive wizard can identify an improvement to the gamification system. In various examples, the identification of the improvement to the gamification system can be based on the monitored performance of the respective gamification system. For example, the determination can be based on a failure of the gamification system to achieve one or more of the customer's goals. In some examples, the identification of the improvement to the gamification system can be based on gamification systems in the same and/or a similar scenario. For example, multiple gamification systems show progress data slowing on a particular expertise track at a certain level. As such, an improvement to the level of the expertise track may be identified.

At block 1408, the adaptive wizard may implement the improvement to the gamification system. Following the example from above, the improvement to the level of the expertise track may be implemented across the multiple gamification systems. The adaptive wizard may send an update to the customer to implement and/or automatically update the gamification system at a certain time.

In various examples, the adaptive wizard may monitor the performance of the improved gamification system, such as by looping back to block 1404. In such examples, the adaptive wizard may continue to improve the gamification systems, even after gamification system implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 106, 124, 126 or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   a processor;
   a computer-readable media including instructions for an adaptive wizard framework, for actuation by the processor, the adaptive wizard framework comprising:
   a scenario module configured to:
      cause a presentation of one or more scenarios on a display of a user computing device, wherein the one or more scenarios are use cases; and
      receive, via a user interface of the customer computing device, a scenario of the one or more scenarios, the scenario corresponding to a gamification system and wherein a user selection represents one or more use cases associated with the user, and wherein the user selection is used to generate a gamification system in an online environment for customers to increase customer engagement with the gamification system;
   a goal-defining module configured to:
      cause a presentation of a first query on the display of the user computing device, wherein the first query is generated heuristically;
      receive, via the user interface, a first response corresponding to the first query;
      based at least in part on the first response, cause a presentation of a second query on the display of the user computing device;
      determine, based at least in part on the first response and a second response to the second query, a goal of the user; and
      determine, based at least in part on the first response and the second response, a model of the gamification system;
   a feature module configured to determine a feature of the gamification system, the feature being based at least in part on the model of the gamification system, and wherein the feature assists the user achieving the determined goal of the user;
   a build module configured to:
      build codes for the gamification system based at least in part on the scenario, the goal, the model and the feature;
      transmit the codes to display the gamification system on a website; and an adaptive wizard module configured to:
      monitor a performance of the gamification system, the performance being based at least in part on the goal;
      identify, based at least in part on the performance, an improvement to the gamification system;
      implement the improvement to the gamification system; and
      display an improved gamification system on the website.

2. A system as claim 1 recites, wherein the build module is further configured to publish the gamification system on a website of the customer.

3. A system as claim 1 recites, further comprising:
   a visualization module configured to generate a visualization for the gamification system.

4. A system as claim 1 recites, wherein the feature module is further configured to determine a recommended feature or an optional feature based at least in part on the model.

5. A system as claim 1 recites, wherein the scenario is based at least in part on actions of a user on a website associated with the customer.

6. A system as claim 1 recites, wherein the goal is further based, at least in part, on actions of a user on a website associated with the customer.

7. A computer-implemented method, comprising:
   an adaptive wizard module displaying a plurality of scenarios on a device associated with a user for user selection thereof, wherein the plurality of scenarios is use cases and wherein the user selection represents one or more use cases associated with the user;
   the adaptive wizard module receiving a user selection associated with, from the device associated with the user via a user interface, a scenario of the plurality of scenarios, wherein the scenario is used to generate a gamification system in an online environment for customers to increase customer engagement with the gamification system;
   the adaptive wizard module displaying one or more questions on the device associated with the user, wherein the one or more questions is generated heuristically;
   the adaptive wizard module receiving, from the device associated with the user via the user interface, a response input to the one or more questions;
   the adaptive wizard module determining, based at least in part on the response input, a goal of the user;
   the adaptive wizard module applying an algorithm, based at least in part on the goal and further based at least in part on historical data stored in a memory storage, to identify a model for the gamification system associated with the user;
   the adaptive wizard module determining a feature of the gamification system, wherein the feature assists the user achieving the determined goal of the user;
   the adaptive wizard module building codes for the gamification system based at least in part on the scenario, the goal, the model and the feature;
   the adaptive wizard module displaying the gamification system on a website;
   the adaptive wizard module monitoring a performance of the gamification system, the performance being based at least in part on the goal;
   the adaptive wizard module identifying, based at least in part on the performance, an improvement to the gamification system;

the adaptive wizard module implementing the improvement to the gamification system; and the adaptive wizard module displaying an improved gamification system on the website.

8. A method as claim 7 recites, further comprising monitoring behavior of a user on a website, wherein the identifying the model is further based on the monitored behavior.

9. A method as claim 7 recites, further comprising:

the adaptive wizard module generating one or more visualizations for the gamification system; and the adaptive wizard module receiving, from the device via the user interface, a selection of a visualization, wherein the building the gamification system further comprises including a code for the visualization in the gamification system.

10. A method as claim 7 recites, further comprising:

the adaptive wizard module displaying the feature on the device;

the adaptive wizard module receiving, from the device via the user interface, a modification to a sub-feature of the feature; and the adaptive wizard module incorporating the sub-feature into the gamification system.

11. A method as claim 7 recites, further comprising:

the adaptive wizard module determining a second feature of the gamification system;

the adaptive wizard module displaying the second feature on the device;

the adaptive wizard module receiving, from the device via the user interface, a modification to the second feature; and the adaptive wizard module incorporating the modification to the second feature into the gamification system.

12. A method as claim 7 recites, wherein the goal is further determined based at least in part on a user behavior on a website.

13. A method as claim 7 recites, further comprising monitoring an action of a user on a website, wherein the determining the goal is based at least in part on the action.

14. A non-transitory computer-readable medium having thereon computer-executable instructions, the computer-executable instructions responsive to execution configuring a device to perform operations comprising:

receiving, from a customer device via a user interface, a scenario wherein the scenario is used to generate a gamification system in an online environment for customers to increase customer engagement with the gamification system;

determining one or more questions based at least in part on the scenario, wherein the one or more questions is generated heuristically;

causing a display of the one or more questions on the customer device;

receiving, from the customer device via the user interface, response input to the one or more questions;

determining, based at least in part on the response input, a goal of the customer enterprise;

applying an algorithm, based at least in part on the goal and further based at least in part on historical data stored in a memory storage, to identify a model for the gamification system associated with the user;

determining, based at least in part on the goal of the customer enterprise, a feature of the gamification system, wherein the feature assists the user achieving the determined goal of the user;

building codes for the gamification system based at least in part on the scenario, the goal, the model, and the feature;

displaying the gamification system on a website;

monitoring a performance of the gamification system, the performance being based at least in part on the goal;

identifying, based at least in part on the performance, an improvement to the gamification system;

implementing the improvement to the gamification system; and displaying an improved gamification system on the website.

15. A non-transitory computer-readable medium as claim 14 recites, the operations further comprising:

causing a display of the feature on the customer device; and receiving, from the customer device via the user interface, a modification of the feature, wherein the building the gamification system is based at least in part on the modification of the feature.

16. A non-transitory computer-readable medium as claim 14 recites, further comprising:

generating one or more visualizations for the gamification system; and receiving, from the customer device via the user interface, a selection of a visualization, wherein the building the gamification system is based at least in part on the visualization.

* * * * *